(12) United States Patent
Scott

(10) Patent No.: US 8,454,047 B1
(45) Date of Patent: Jun. 4, 2013

(54) SPEED HITCH PIN

(75) Inventor: Gary M. Scott, Milwaukie, OR (US)

(73) Assignee: Progress Mfg. Inc., Provo, UT (US)

( * ) Notice: Subject to any disclaimer, the term of this patent is extended or adjusted under 35 U.S.C. 154(b) by 554 days.

(21) Appl. No.: 12/240,857

(22) Filed: Sep. 29, 2008

Related U.S. Application Data

(60) Provisional application No. 60/995,745, filed on Sep. 28, 2007, provisional application No. 60/997,270, filed on Oct. 1, 2007.

(51) Int. Cl.
*B60D 1/02* (2006.01)
(52) U.S. Cl.
USPC ........ 280/507; 280/508; 280/515; 403/322.4; 403/325

(58) Field of Classification Search
USPC  213/188; 280/504, 507, 508, 515; 403/322.4, 403/325
See application file for complete search history.

(56) References Cited

U.S. PATENT DOCUMENTS

| | | | | |
|---|---|---|---|---|
| 3,572,766 | A | * | 3/1971 | Jezek ............................ 280/515 |
| 5,000,067 | A | * | 3/1991 | Kolbusz et al. ................. 81/436 |
| 6,145,866 | A | * | 11/2000 | Peter ............................ 280/515 |

* cited by examiner

*Primary Examiner* — Tony H. Winner
*Assistant Examiner* — Jacob Knutson
(74) *Attorney, Agent, or Firm* — Clayton, Howarth & Cannon, P.C.

(57) ABSTRACT

An improved hitch pin system for improving the speed and safety of attaching a receiver insert into a receiver on a tow vehicle.

58 Claims, 21 Drawing Sheets

SPEED HITCH PIN

CROSS REFERENCE TO PRIOR APPLICATIONS

This application claims the benefit of both of the following two (2) applications: U.S. Provisional Application No. 60/995,745, filed Sep. 28, 2007; and U.S. Provisional Application No. 60/997,270, filed Oct. 1, 2007, which are hereby incorporated by reference in the enclosed application in their entireties, including but not limited to those portions that specifically appear hereinafter, the incorporation by reference being made with the following exception: In the event that any portion of the above-referenced provisional applications are inconsistent, with this application, this application supercedes said above-referenced provisional applications.

STATEMENT REGARDING FEDERALLY SPONSORED RESEARCH OR DEVELOPMENT

Not Applicable.

BACKGROUND OF THE INVENTION

1. The Field of the Invention

The present disclosure relates generally to trailer hitch systems, and more particularly, but not necessarily entirely, to an improved hitch pin component of a hitch system that facilitates faster and more convenient use of a hitch receiver on a vehicle.

2. Description of Related Art

Various types of apparatuses are known in the art for making use of a receiver on vehicles. One of the most common types of receiver apparatuses are towing systems for attaching a trailer to a tow vehicle and uses a ball hitch. Typical ball hitches have a generally spherical shaped ball having a stem or threaded rod extending from a base of the ball. The ball hitch is attached to a receiver insert. The receiver insert may be then inserted into the receiver forming a receiver assembly. A trailer coupling member, such as a ball clamp, positioned on a front of the trailer tongue, may engage the ball hitch in a loose fit, and may be secured to the ball in preparation for towing.

A strong pin and/or clip may be then used to retain the receiver insert within the receiver while under the heavy load of the trailer. Typically the pin is pushed into a hole on the outside of the receiver which passes through the receiver. The pin typically has a length such that it can span the outside width of the receiver while having additional space for a retention device, such as a cotter key. The receiver insert typically will have a through-hole that will correspond to the through-hole of the receiver. In use, a receiver insert is inserted into the receiver such that the corresponding holes align. Once aligned the pin, usually referred to as a hitch pin, is pushed through the assembly thereby locking the members in place. The hitch pin must be sized to fit through the holes such that it does not have excessive play when fitted. If too much play is present in the assembly, an impact force will occur from the load on the receiver insert during acceleration and deceleration. Because of the desire for a good fitting hitch pin, its dimensions will be similar to the dimensions of the holes in the receiver and receiver insert. Close dimensioning results in a hitch pin that will require some effort for proper alignment with the hole openings. Much of the time this effort must be performed under the rear of a vehicle while stooping down or kneeling on the ground.

Typically, the hitch pin requires the use of a cotter key. A receiver assembly is subjected to dirt and road grime during use, and the cotter key and cotter key hole can become coated with dirt. Removing the cotter key and replacing the cotter key can be messy and generally requires two hands.

In recent years the popularity of outdoor activities has grown and more outdoor products than ever before are on the market. Many of these items take advantage of receivers on vehicles for mounting outdoor related devices. A very common example is that of a bike rack that has a receiver insert mounted thereon. The bike rack receiver insert, like the ball hitch receiver insert, is locked in place generally by a hitch pin. Other devices that use a receiver insert may be; large catering stoves, wheel chair platforms, loading platforms, and storage compartments, to name a few commonly seen.

Each of the devices needs to be mounted and dismounted for use and storage, and most commonly use a hitch pin for securing the receiver insert within the receiver. Each time a device is mounted or dismounted the hitch pin must be aligned and pinned in place.

There have been many attempts to improve the method of securing receiver inserts into receivers. Many of those improvements are modifications of the hitch pin and cotter key members. Commonly the cotter key replacement is attached to the hitch pin so that it is not easily lost. However, these also require the use of two hands. Even the improved prior art still requires the user to stoop or work under the rear of the vehicle, exposing them to getting dirty, and even possible back injury. In the case of bad weather some kind of mess on hands and clothes is guaranteed when setting the hitch pin.

As the average American is increasingly over weight, bending over at the waist (as someone is sure to do when trying to keep clothing away from a dirty vehicle) and reaching out and down is a common cause for lower back injuries. Additionally, also having to twist and crane your neck to see and align the holes of the receiver assembly, only exacerbates the situation.

The present disclosure minimizes, and in some aspects eliminates, the above-mentioned failures, and other problems, by utilizing the methods and structural features described herein.

SUMMARY OF THE INVENTION

Disclosed is a hitch pin comprising a pin member having an extension member. Said extension member may be sized to provide placement of said pin remotely. The hitch pin may further comprise an alignment member disposed on said extension member and located remotely from said pin. Said alignment member may be oriented parallel to said pin.

Disclosed is a hitch pin comprising a pin member having an extension member disposed thereon. Said extension member may be sized to provide placement of said pin remotely. The hitch pin may further comprise an alignment member disposed on said extension member and located remotely from said pin. Said alignment member may be oriented parallel to said pin. The hitch pin may further comprise a locking member that may be sized substantially the same as said extension member. Said locking member may be rotatably disposed axially on said aligning member.

Disclosed is a hitch pin comprising a pin member having an extension member disposed thereon. Said extension member may be sized to provide placement of said pin remotely. The hitch pin may further comprise an alignment member disposed on said extension member and may be located remotely from said pin. Said alignment member may be oriented parallel to said pin. The hitch pin may further comprise a locking member that may be sized substantially the same as said extension member. Said locking member may be rotatably disposed axially on said aligning member.

Disclosed is a hitch pin comprising a pin member having an extension member disposed thereon. Said extension member may be sized to provide placement of said pin remotely. The hitch pin may further comprise an alignment member disposed on said extension member and may be located remotely from said pin. Said alignment member may be oriented parallel to said pin. The hitch pin may further comprise a locking member that may be sized substantially the same as said extension member. Said locking member may be rotatably disposed axially on said aligning member and may be contacting the pin member at the end opposite the end disposed on said aligning member.

Disclosed is a hitch pin comprising a pin member having an extension member disposed thereon. Said extension member may be sized to provide placement of said pin remotely. The hitch pin my further comprise an alignment member disposed on said extension member and may be located remotely from said pin. Said alignment member may be oriented parallel to said pin. The hitch pin may further comprise a locking member that may be sized substantially the same as said extension member. Said locking member may rotatably be disposed axially on said aligning member and contacting the pin member at the end opposite the end disposed on said aligning member.

Disclosed is a hitch pin comprising a pin member having an extension member. Said extension member may be sized to provide placement of said pin remotely. The hitch pin may further comprise an alignment member disposed on said extension member and located remotely from said pin. Said alignment member may be oriented parallel to said pin. Said alignment member may be configured for gripping by a user.

Disclosed is a hitch pin comprising a pin member having an extension member disposed thereon. Said extension member may be sized to provide placement of said pin remotely. The hitch pin may further comprise an alignment member disposed on said extension member and may be located remotely from said pin. Said alignment member may be oriented parallel to said pin. The hitch pin may further comprise a locking member that may be sized substantially the same as said extension member. Said locking member may rotatably be disposed axially on said aligning member and contacting the pin member at the end opposite the end disposed on said aligning member. Said alignment member may be configured for gripping by a user and may have a locking mechanism therein for preventing movement in said locking member.

Disclosed is a hitch pin comprising a pin member having an extension member disposed thereon. Said extension member may be sized to provide placement of said pin remotely. The hitch pin may further comprise an alignment member disposed on said extension member and located remotely from said pin. Said alignment member may be oriented parallel to said pin. The hitch pin may further comprise a locking member that may be sized substantially the same as said extension member. Said locking member may rotatably be disposed axially on said aligning member and may contact the pin member at the end opposite the end disposed on said aligning member. Said alignment member may be configured for gripping by a user and having a locking mechanism therein for preventing movement in said locking member. The hitch pin may further comprise a security feature that prevents said locking mechanism from being actuated.

Disclosed is a hitch pin comprising a pin member having an extension member. Said extension member may be sized to provide placement of said pin remotely. Said extension member may have a bend therein for providing a greater horizontal directional component to the reach of a user. The hitch pin may further comprise an alignment member disposed on said extension member and located remotely from said pin. Said alignment member may be oriented parallel to said pin. Said alignment member may be configured for gripping by a user. Said pin member may be further comprising a catch for catching said locking member therein.

Disclosed is a method for using an improved hitch pin comprising aligning an alignment member, that may be rigidly attached to a pin member by an extension member, with a through-hole of a receiver assembly. Wherein said alignment member may be oriented parallel to said pin member. Said method further displacing said alignment member horizontally, such that the pin member is inserted into said through-hole of said receiver assembly.

Disclosed is a method for using an improved hitch pin comprising, aligning an alignment member, that may be rigidly attached to a pin member by an extension member, with a through-hole of a receiver assembly. Wherein said alignment member may be oriented parallel to said pin member. Said method further displacing said alignment member horizontally such that the pin member is inserted into said through-hole of said receiver assembly and locking said pin member within said through-hole.

Disclosed is a method for using an improved hitch pin comprising, aligning an alignment member rigidly attached to a pin member by an extension member with a through-hole of a receiver assembly. Wherein said alignment member is oriented parallel to said pin member. Said method further comprising, displacing said alignment member horizontally such that the pin member is inserted into said through-hole of said receiver assembly. Said method further comprising, locking said pin member within said through-hole and wherein all process are done by one hand.

Disclosed is a method for using an improved hitch pin comprising, aligning an alignment member rigidly attached to a pin member by an extension member with a through-hole of a receiver assembly. Wherein said alignment member may be oriented parallel to said pin member. Said method further comprising, displacing said alignment member horizontally such that the pin member is inserted into said through-hole of said receiver assembly. Said method further comprising, locking said pin member within said through-hole and wherein said locking process comprises moving a locking member about an axis that is coaxial with said aligning member.

Disclosed is a method for using an improved hitch pin comprising, aligning an alignment member that maybe rigidly attached to a pin member by an extension member with a through-hole of a receiver assembly. Wherein said alignment member may be oriented parallel to said pin member. Said method further comprising displacing said alignment member horizontally such that the pin member is inserted into said through-hole of said receiver assembly. Said method further comprising locking said pin member within said through-hole and wherein said locking process comprises moving a locking member about an axis that is coaxial with said aligning member. Said method further comprising securing said locking member in said locked position with a security device.

Disclosed is a method of making an improved hitch pin comprising forming a hitch pin member, an extension member, and an alignment member out of a single piece of material. The method of making further comprising forming a locking member and rotatably attaching said locking member onto said aligning member.

Disclosed is a method of making an improved hitch pin comprising forming a hitch pin member, an extension member, and an alignment member into a single rigid assembly. The method of making further comprising forming a locking member and rotatably attaching said locking member onto said aligning member.

Specific details and additional features and advantages of the disclosure will be set forth in the description which follows, and in part will be apparent from the embodiments, or may be learned by the practice of the disclosure without undue experimentation.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
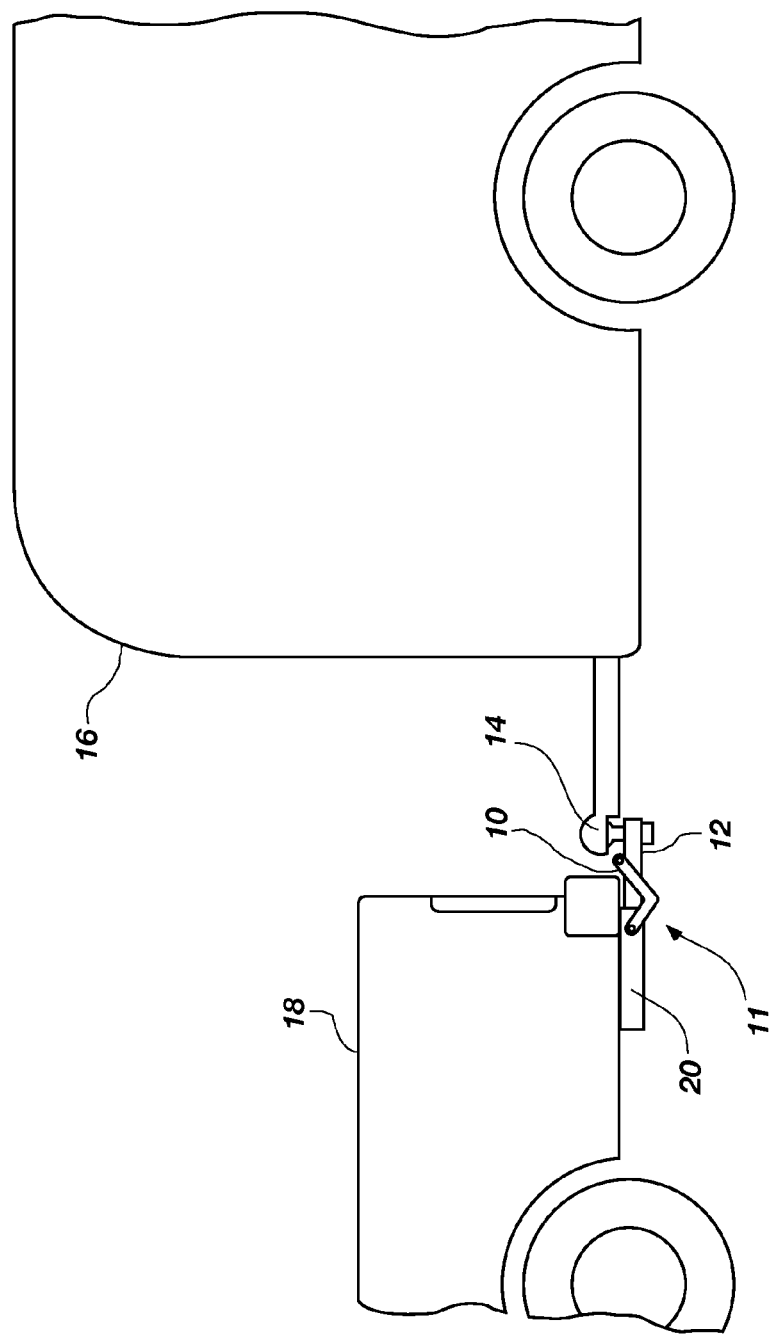
FIG. 1 is illustrative of a receiver assembly in use.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for providing a trailer hitch system are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

Any publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. Any reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "elongate" shall be construed broadly to include structures that have one dimension, such as a length, that is greater than another dimension, such as a width or diameter.

As used herein, the term "actuate" shall be construed broadly to include initiating the function of a mechanism as well as allowing the mechanism to return to a resting state, such as pressing a control button is an actuation and releasing a control button is an actuation.

Applicant herein discloses an improved hitch pin system for improving the speed and safety of attaching a receiver insert into a receiver on a tow vehicle. With reference to FIG. 1 an improved hitch pin 10 as it may be put to use will be discussed. A receiver assembly 11 may include an elongate metal receiver insert 12 having a square cross section, and the receiver insert 12 may have a hitch ball 14 disposed thereon.

A trailer 16 can be attached to the hitch ball 14 to be towed by a towing vehicle 18, as known to those of ordinary skill. Many additional items may use a receiver insert for support on a towing vehicle. The receiver insert 12, may be removably inserted into the receiver 20 of the tow vehicle 18, and should be fixedly attached therein, to prevent disassociation of the receiver assembly 11. This may be accomplished by aligning an opening (not shown) in the body of the receiver insert between, and in alignment with opposing openings (not shown) in opposing sides of the receiver 20. The receiver assembly 11 is then locked together by placing a hitch pin through the openings of the receiver assembly 11, and thereby through the opening in the receiver insert 12. This is most conveniently accomplished with an improved hitch pin 10, such as the speed hitch pin designated generally as 22 in FIG. 2.

Figure 2:
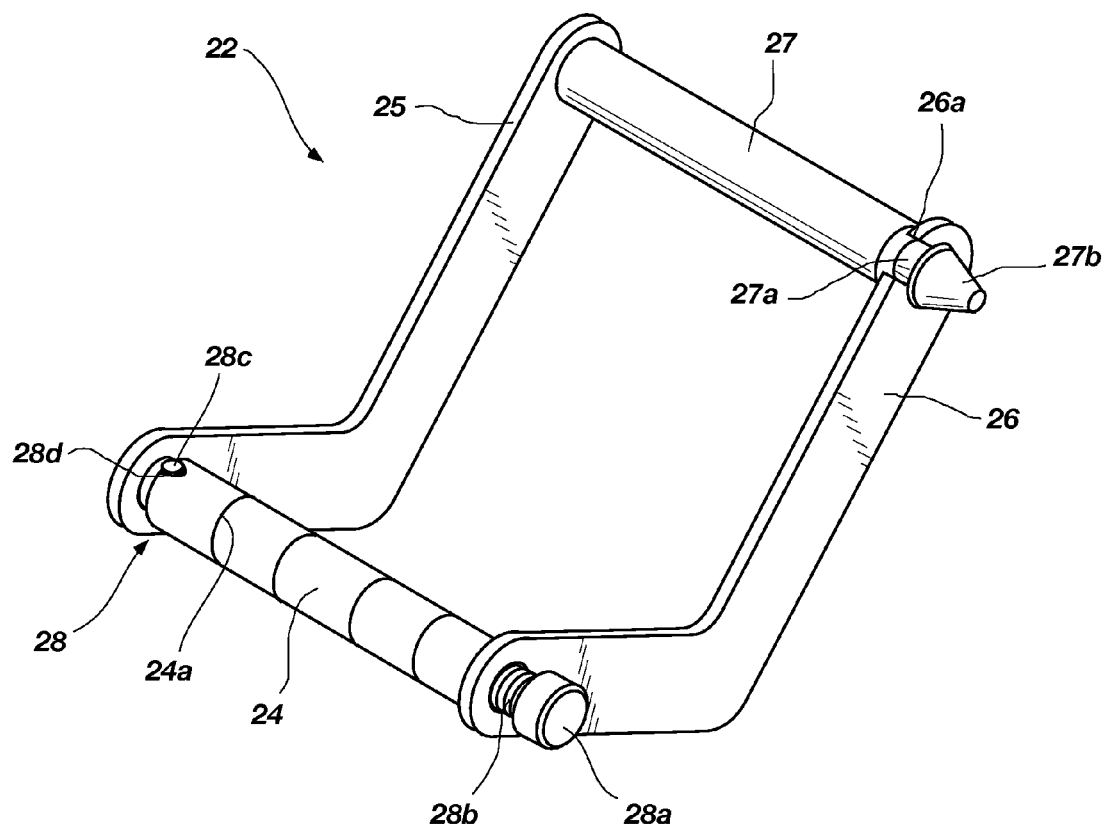
FIG. 2 is illustrative of one embodiment of the improved hitch pin disclosed herein.
Figure 3:
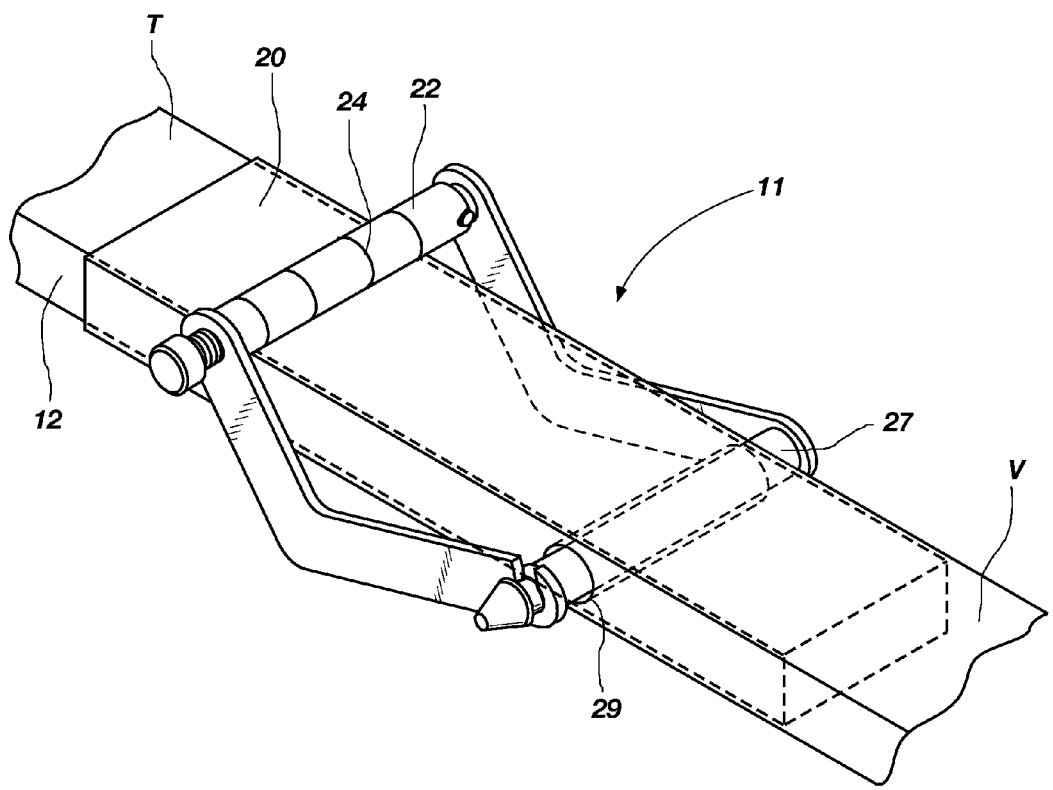
FIG. 3 is illustrative of one embodiment of the improved hitch pin disclosed herein as used in a receiver assembly.

Referring to FIGS. 2 and 3 an embodiment of a speed hitch pin 22 will be discussed. The speed hitch pin 22 may have an alignment member 24, an extension member 25, and a locking member 26 that hold the hitch pin 27. The hitch pin 27 is configured to be placed into and through the receiver 20 and the receiver insert 12 and to protrude a free end 27b out from the receiver 20. The locking member 26 of the speed hitch pin 22 then locks onto the free end 27b of the hitch pin 27, preventing dislocation of the receiver insert 12 from the receiver 20. The speed hitch pin 22 may include a gripping aid 24a disposed on said aligning member 24 for adding comfort and grip while using it. The speed hitch pin 22 may further comprise a locking mechanism 28 for preventing the locking member 26 from being moved. The locking mechanism 28 may be comprised of an actuator 28a for allowing a user to actuate the locking mechanism 28, and a biasing device 28b such as a spring for providing a resistance force within the locking mechanism 28 to prevent unintentional actuation of the locking mechanism 28. The locking mechanism 28 may further comprise a friction structure 28c and a corresponding reactive structure 28d. In the embodiment the friction structure 28c is a ball bearing detent mechanism. Also in the embodiment shown, the reactive structure 28d is illustrated as the surface of an indent indicated by the use of an arrow. The locking member 26 may also have a hitch pin notch 26a for corresponding with recessed portion 27a disposed on the hitch pin 27. As shown in FIGS. 2 and 3, the hitch pin notch 26a communicates with recessed portion 27a when the speed hitch pin 22 is in a closed configuration.

Referring also to FIG. 3 the placement of an embodiment of the speed hitch pin 22 into a receiver assembly 11 will be discussed. The portion of the receiver assembly 11 that corresponds to the rear of the towing vehicle 18 is designated by the "V" near the broken line portion of the receiver 20. A trailer 16 is designated by the "T" near the broken line portion of the receiver insert 12. In use a user grasps the alignment member 24 and, standing at the rear of the towing vehicle 18 having a receiver assembly 11, actuates the locking mechanism 28 (FIG. 1) by depressing the actuator 28a. The locking mechanism 28 releases the friction structure 28c so that it reduces the mechanical friction that is being exerted on the reactive structure 28d. The reactive structure 28d is the surface designated by the arrow 28 that is in communication with friction structure 28c. By reducing the mechanical friction between the friction structure 28c and the reactive structure surface 28d, an axil member (not shown—but may extend through the alignment member 24) connected to the locking member 26 rotates about its axis causing the axial rotation of locking member 26 such that the hitch pin can freely be slid into the opening in the receiver assembly 11. The user may then remotely align the alignment member 24 such that the hitch pin 27 is approximately coaxially aligned with an external receiver opening 29 located on the receiver assembly 11. The hitch pin may then be slid into the external receiver opening 29 until it protrudes a desired amount out of the other side of the receiver assembly 11. The hitch pin 27 thereby prevents the receiver 20 and the receiver insert 12 from becoming dislocated. The locking member 26 of the speed hitch pin 22 then is rotated back into the closed position such that hitch pin notch 26a communicates with the recess portion 27a and thereby prevents the hitch pin 27 from backing out of the receiver assembly 11 and preventing dislocation of the receiver insert 12 from the receiver 20. In other words a method for using a speed hitch pin 22 comprises aligning an alignment member 24 that is rigidly attached to a hitch pin 27 by an extension member 25 with an external receiver opening 29 of a receiver assembly 10. Wherein said alignment member 24 is oriented parallel to said hitch pin 27 and thereby the external receiver opening 29. The method further comprises displacing said alignment member 24 horizontally such that the hitch pin member 27 is inserted into said external receiver opening 29 of said receiver assembly 10. The method may further comprise locking said hitch pin member 27 within said external receiver opening 29 and wherein said locking process comprises moving a locking member 26 about an axis that is coaxial with said aligning member 24. Said method further comprising securing said locking member 26 in said locked position with a locking mechanism 28.

Figure 4:
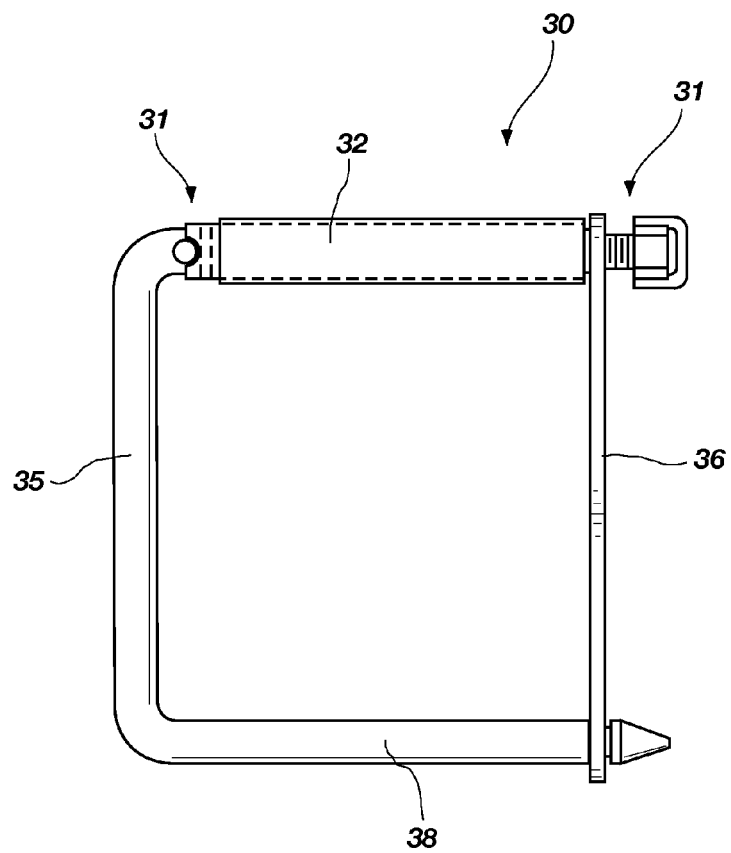
FIG. 4 is illustrative of one embodiment of the improved hitch pin disclosed herein as made of two primary structural members.

Referring now to FIG. 4, an embodiment of a speed hitch pin 30 will be discussed. The speed hitch pin 30 may comprise an alignment portion 32, extension portion 35, and a hitch pin portion 38 made from a single piece of material. The single piece of material may be formed such that the alignment portion 32 is oriented parallel to the hitch pin portion 38 and remotely located relative to each other by the extension portion 35. The hitch pin portion 38 is configured to be placed into and through a receiver (not shown) and a receiver insert (not shown) and to protrude a portion out from the receiver assembly. A locking member 36 of the speed hitch pin 30 then locks onto the protruding portion of the hitch pin portion 38, preventing dislocation of the receiver insert from the receiver. The speed hitch pin 30 may further comprise a locking mechanism 31 for preventing the locking member 36 from being moved. Such a configuration may be cost effective to manufacture and provides the advantage of having fewer parts for assembly.

Figure 5:
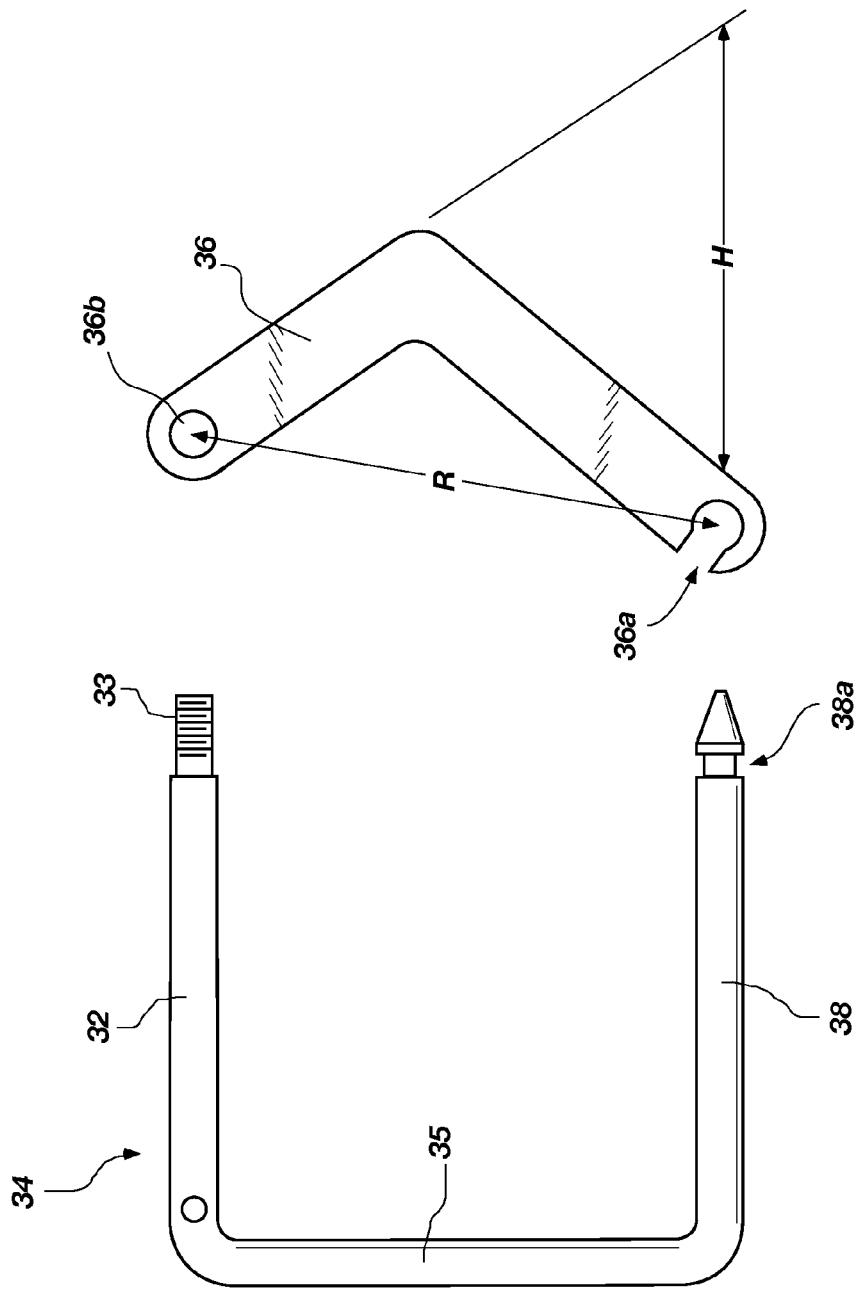
FIG. 5 is illustrative of one embodiment of the improved hitch pin disclosed herein as separated into two primary structural members.

Referring now to FIG. 5, an embodiment of the components of the embodiment of FIG. 4 will be discussed. The speed hitch pin 30 may be comprised of two primary components. The first component 34 may comprise an alignment portion 32, extension portion 35, and a hitch pin portion 38 made from a single piece of material. The single piece of material may be formed such that the alignment portion 32 is oriented parallel to the hitch pin portion 38 and remotely located relative to each other by the extension portion 35. The hitch pin 38 is configured to be placed into and through a receiver (not shown) and the receiver insert (not shown) and to protrude a portion out from receiver assembly. A threaded portion 33 may be formed at one end of the alignment portion 32 for fastening another component thereon. A second component may be a locking member 36 for preventing the unintentional displacement of the speed hitch pin 30 (FIG. 4). The locking member 36 may comprise a notched portion 36a for communicating with a recessed portion 38a on the hitch pin portion 38 of the speed hitch pin 30. The locking member 36 may further comprise an opening 36b for receiving the threaded portion 33 during assembly. In the FIG. 5 it should be noted that locking member 36 is seen in a 90 degree rotated position relative to its assembly position as seen if FIG. 4. The extension portion 35 may be configured to match the bent configuration of member 36, there by adding a horizontal component "H" to the reach "R" provided by the extension portion 35. The reach "R" corresponds to the reach advantage the speed hitch pin 30 provides. The advantage is derived from the user not having to reach the distance covered by the speed hitch pin 30 when replacing a hitch pin.

Figure 6:
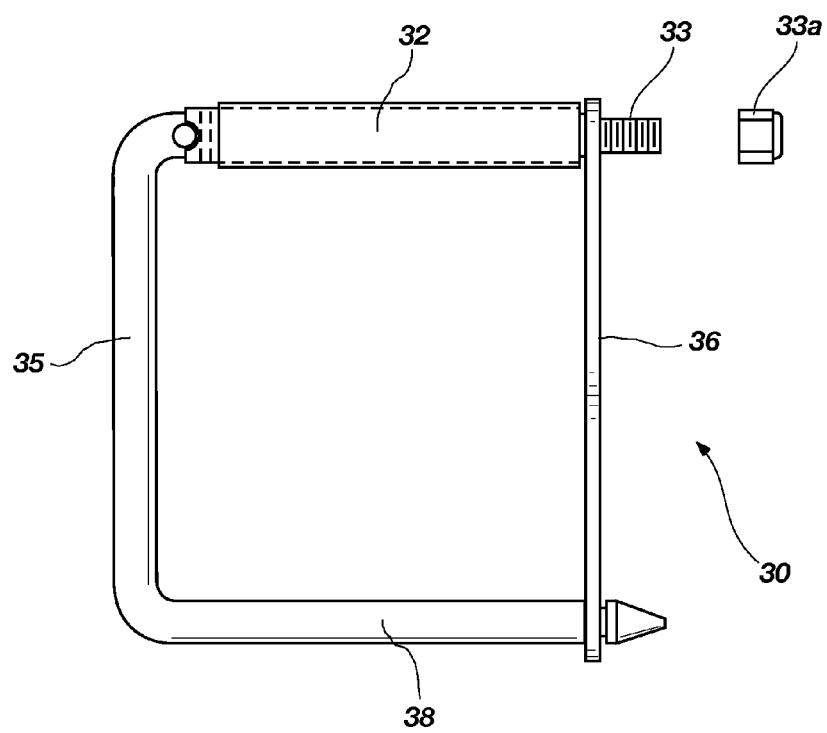
FIG. 6 is illustrative of one embodiment of the improved hitch pin disclosed herein as assembled from two primary structural members.

Referring now to FIG. 6, the assembly of the components of FIG. 4 will be discussed. The speed hitch pin 30 may be assembled by rotating the locking member 36 into the assembled position such that the axis of threaded portion 33 is aligned with the axis of the opening 36b of the locking member 36. The locking member 36 then receives the threaded portion 33 into the opening 36b therein such that a portion of threaded portion 33 protrudes therefrom. A fastener 33a may be threaded onto the protruding portion of the threaded portion 33. Alternatively, a locking mechanism may be incorporated with the fastener 33a to provide additional security advantages. The speed hitch pin 30 is now ready for use consistent with the use described relative to FIG. 3. For example, a method for using a speed hitch pin 30 may comprise aligning an alignment portion 32 that is rigidly attached to a hitch pin portion 38 by an extension portion 35, with a through-hole (not shown) of a receiver assembly (not shown). Wherein said alignment portion 32 is oriented parallel to said hitch pin portion 38. The method further comprises displacing said alignment portion 32 horizontally such that the hitch pin portion 38 is inserted into the through-hole of said receiver assembly. The method may further comprise locking said hitch pin portion 38 within said through-hole, wherein said locking process comprises moving a locking member 36 about an axis that is coaxial with said aligning member 32. Said method further comprising securing said locking member 36 in said locked position with a locking mechanism 31 (FIG. 4).

Figure 7:
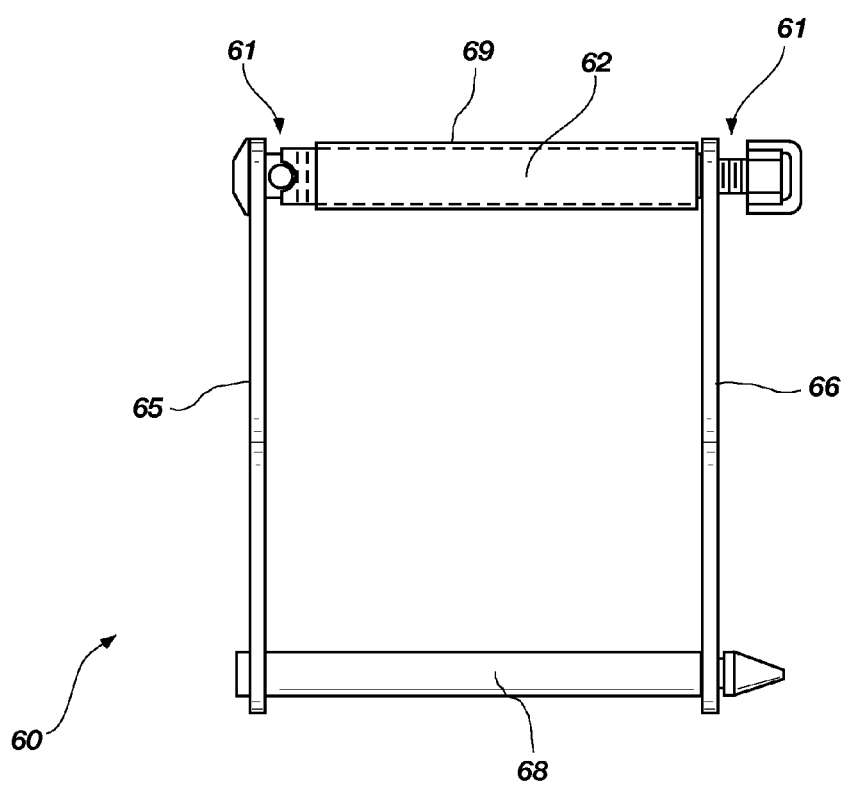
FIG. 7 is illustrative of one embodiment of the improved hitch pin disclosed as made of four primary structural members.

Referring to FIG. 7 an embodiment of a speed hitch pin 60 comprised of 4 primary components will be discussed. The speed hitch pin 60 may comprise the components of: an alignment member 62, an extension member 65, and a locking member 66 that holds the hitch pin 68 in place. The extension member 65 may have ends or portions wherein other components may be attached thereto. The length between the attachment portions may be separated by a length that is at least half of the length of the extension member 65. Portions may over lap the at least half the length. The hitch pin 68 is configured to be placed into and through a receiver (not shown) and a receiver insert (not shown) and to protrude a free end (not shown) out from the receiver. A locking member 66 of the speed hitch pin 60 then locks onto the free end of the hitch pin 68, preventing dislocation of the receiver insert from the receiver. The speed hitch pin 60 may include a gripping aid 69, disposed on said aligning member 62 for adding comfort and grip while using it. The speed hitch pin 60 may further comprise a locking mechanism 61 for preventing the locking member 66 from being moved.

Figure 8:
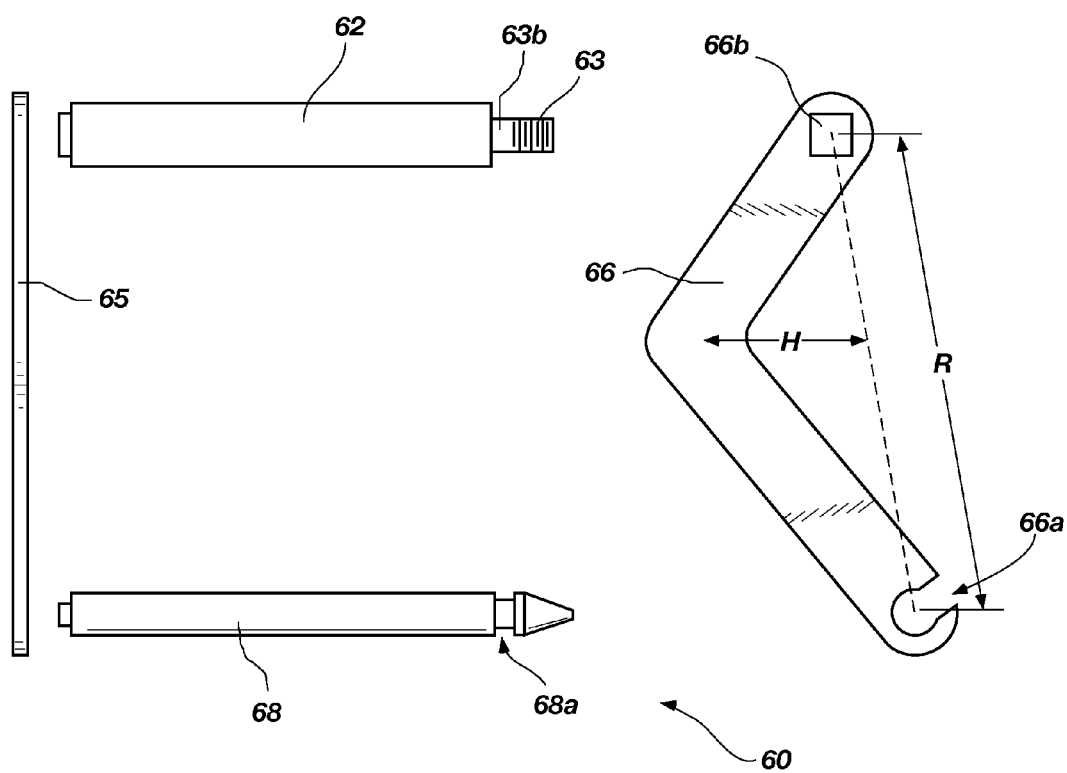
FIG. 8 is illustrative of one embodiment of the improved hitch pin disclosed as separated into four primary structural members.

Referring now to FIG. 8, an embodiment of the components of the embodiment of FIG. 6 will be discussed. The speed hitch pin 60 may be comprised of four primary components. The first component may comprise an alignment member 62. The second component may comprise an extension member 65. The third component may comprise a hitch pin member 68, and the forth component may comprise a locking member 66. The locking member 66 may comprise a notched portion 66a for communicating with a recessed portion 68a on the hitch pin member 68 of the speed hitch pin 60. The locking member 66 may further comprise an opening 66b for receiving the threaded portion 63 during assembly. In FIG. 8 it should be noted that locking member 66 is seen in a 90 degree rotated position relative to its assembly position as seen if FIG. 7. The extension portion 65 may be configured to match the bent configuration of member 66, thereby adding a horizontal component "H" to the reach "R" provided by the extension portion 65. The reach "R" corresponds to the advantage the speed hitch pin 60 provides. The advantage is derived from the user not having to reach and stoop the distance covered by the speed hitch pin 60.

Figure 9:
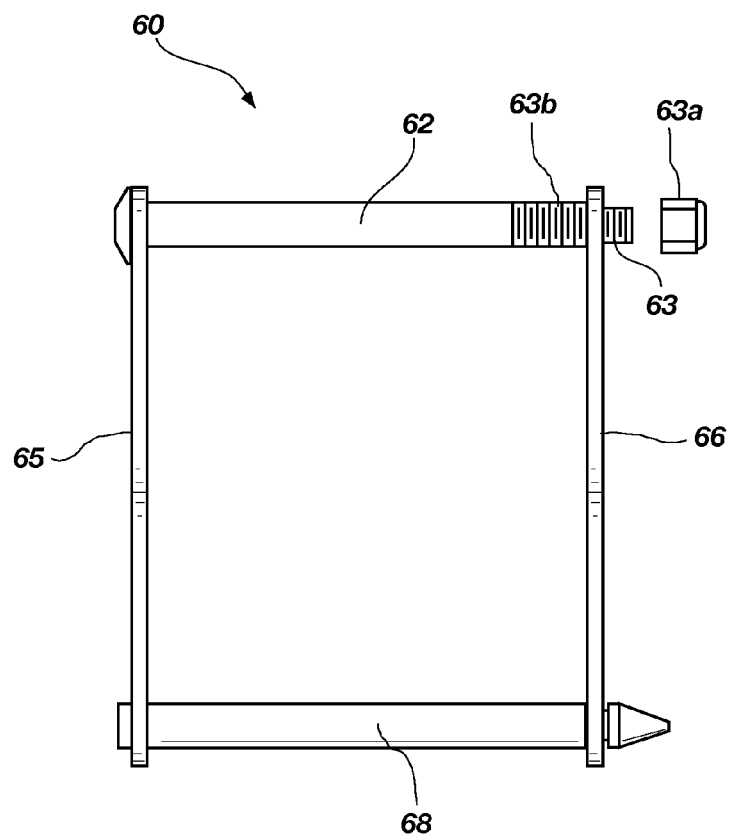
FIG. 9 is illustrative of one embodiment of the improved hitch pin disclosed as assembled from four primary structural members.

Referring now to FIG. 9, the assembly of the components of FIG. 8 will be discussed. The speed hitch pin 60 may be assembled by rotating the locking member 66 into the assembled position such that the axis of threaded portion 63 is aligned with the axis of the opening 66b of the locking member 66. The opening 66b may be configured in a square configuration to provide rotational resistance such that as a user rotates the alignment portion 62 around the axis of the alignment member 62 the locking member 66 will rotate in coordination. The threaded portion 63 of the alignment member may have a squared portion 63b for engaging a squared portion in the locking member. The locking member 66 then receives the threaded portion 63 into the opening 66b therein such that a portion of the threaded portion 63 protrudes therefrom. A fastener 63a may be threaded onto the protruding portion of the threaded portion 63.

Alternatively, a locking mechanism may be incorporated with the fastener 63a to provide additional advantages. The speed hitch pin 60 is now ready for use consistent with the use described relative to FIG. 2. For example, a method for using a speed hitch pin 60 may comprise aligning an alignment member 62 that is rigidly attached to a hitch pin member 68 by an extension member 65 having a through-hole (not shown) of a receiver assembly (not shown). Wherein said alignment member 62 is oriented parallel to said hitch pin member 68. The method further comprises displacing said alignment member 62 horizontally such that the hitch pin member 68 is inserted into the through-hole of the receiver assembly. The method may further comprise locking said pin member 68 within said through-hole and wherein said locking process comprises moving the locking member 66 about an axis that is coaxial with said aligning member 62. Said method further comprising securing said locking member 66 in said locked position with a locking mechanism 61 (FIG. 7).

Figure 10:
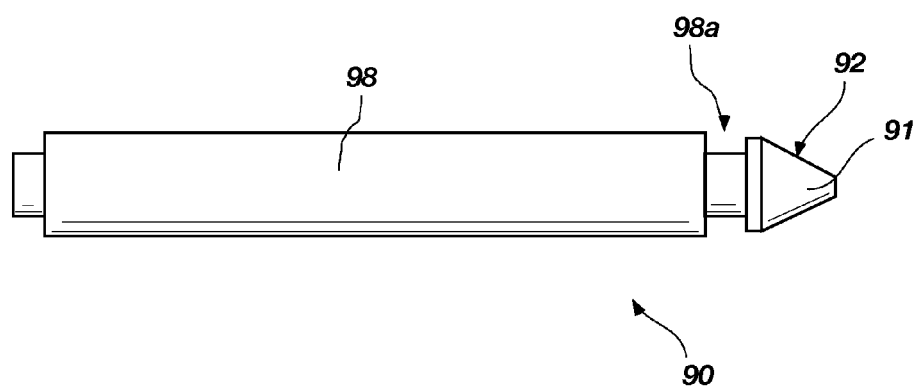
FIG. 10 is illustrative of one embodiment of the improved hitch pin pin.

Referring now to FIG. 10 an embodiment of a hitch pin member 90 will be discussed. The hitch pin member 90 may comprise a body portion 98 and a recessed portion 98a disposed thereon. The hitch pin member 90 may further comprise a tip portion 91 wherein the tip portion 91 has a tapered surface 92. The tapered surface 92 aids in the insertion of the hitch pin member 90 by providing a guiding edge for alignment during insertion. The hitch pin 90 should be made of a material capable of resisting a sheering force acting perpendicular to the body portion 98, that is greater than a force exerted on a receiver assembly during use. The body portion 98 should be configured to have a length sufficient to span a receiver assembly such that the sheering load is placed on the widest portion of the hitch pin member 90 which is typically the body portion.

Figure 11:
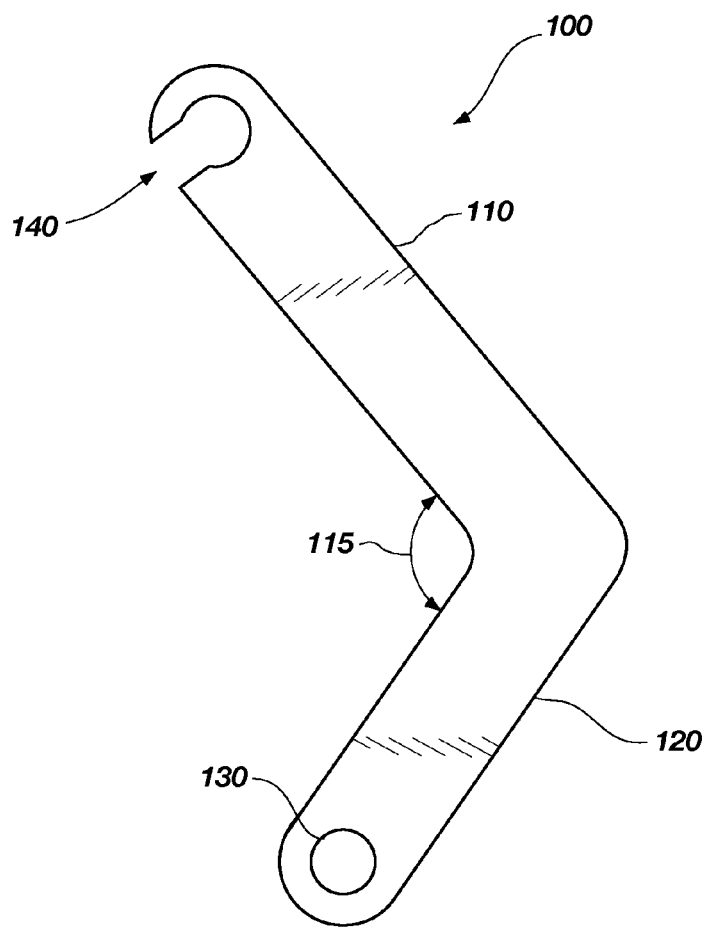
FIG. 11 is illustrative of one embodiment of an improved hitch pin locking member.

Referring now to FIG. 11 an embodiment of a locking member 100 will be discussed. The locking member 100 may comprise a first portion 110 and a second portion 120. The first portion and the second portion may be disposed linearly relative to each other forming a straight member. Additionally, the first portion 110 and the second portion 120 may be disposed at an angle 115 relative to each other. An angled configuration provides a horizontal component to the reach provided by the extension of the improved hitch pin. The reach corresponds to the advantage the speed hitch pin provides. The advantage is derived from the user not having to bodily reach the distance covered by the speed hitch pin. The locking member 100 may further comprise an opening 130 for receiving another component of a speed hitch pin. The opening 130 may be configured in a square configuration to provide rotational resistance such that as a user rotates an alignment portion 130 around the axis of the alignment member the locking member 100 will rotate in coordination. An alignment member may have a squared portion for engaging the squared opening in the locking member 100. The locking member 100 may further comprise a notched portion 140 for communicating with a recessed portion on a hitch pin member in a speed hitch pin assembly.

Figure 12:
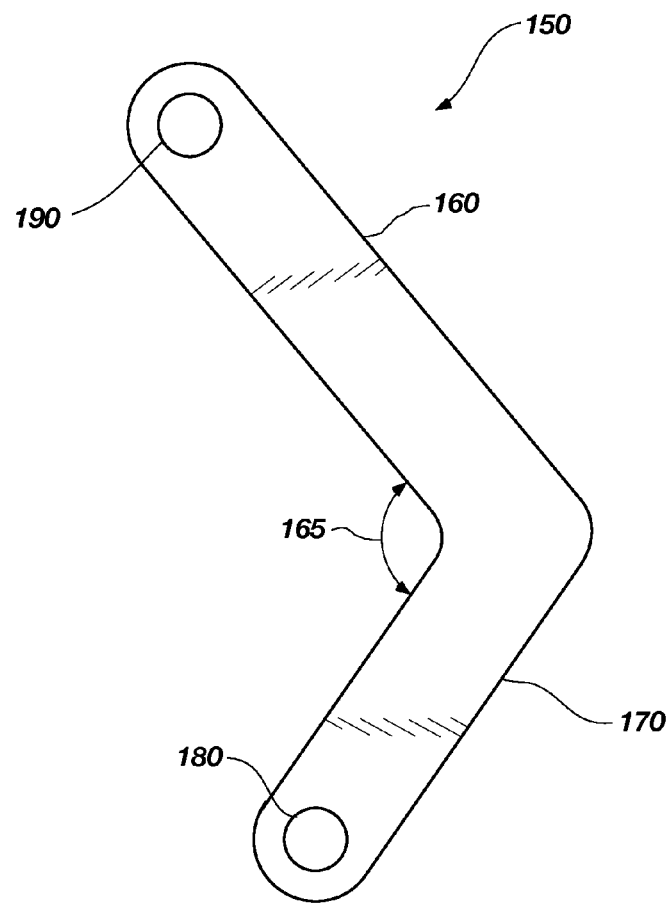
FIG. 12 is illustrative of one embodiment of the improved hitch pin extension member.

Referring now to FIG. 12 an embodiment of an extension member 150 will be discussed. The extension member 150 may comprise a first portion 160 and a second portion 170. The first portion 160 and the second portion 170 may be disposed linearly relative to each other forming a straight member. Additionally, the first portion 160 and the second portion 170 may be disposed at an angle 165 relative to each other. An angled configuration provides a horizontal component to the reach provided by the extension of the improved hitch pin. The reach corresponds to the advantage the speed hitch pin provides. The advantage is derived from the user not having to bodily reach the distance covered by the speed hitch pin. The extension member 150 may further comprise an opening 180 for receiving another component of a speed hitch pin. The opening 180 may be configured in a square configuration to provide rotational resistance relative to other components making up the improved hitch pin. Another attached member may have a squared portion for engaging the squared opening in the extension member 150. The extension member 150 may further comprise a second opening 190 for attaching to another component in a speed hitch pin assembly. The opening 190 may be configured in a square configuration to provide rotational resistance relative to other components making up the speed hitch pin. Another attached member may have a squared portion for engaging the squared opening in the extension member 150.

Figure 13:
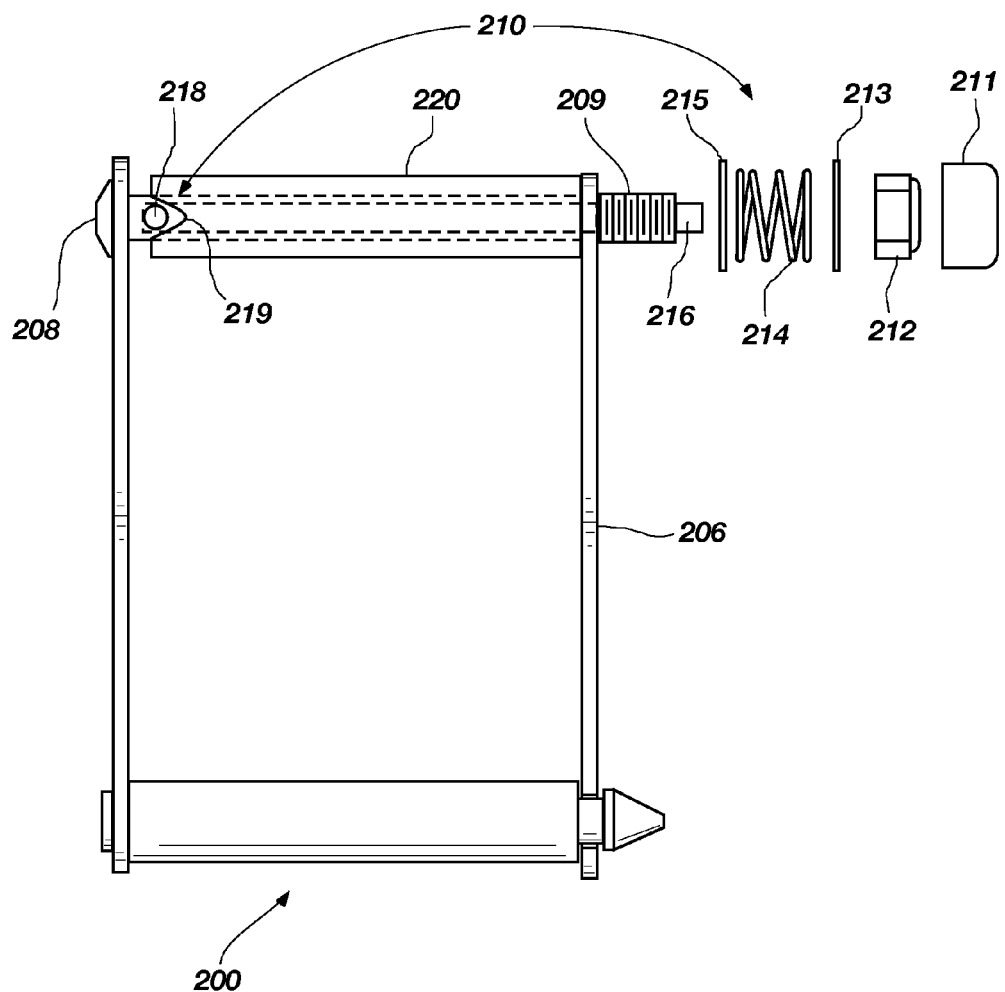
FIG. 13 is illustrative of one embodiment of the improved hitch pin locking mechanism.

With reference to FIG. 13 an embodiment for a locking mechanism 210 will be discussed. A speed hitch pin 200 may comprise a locking mechanism 210 configured for retaining a locking member 206 in position. The locking mechanism 210 may comprise an actuator 211 to interface with a user. The locking mechanism 210 may comprise a retention component 212 for threading onto a threaded portion 209 of an alignment member 208 and thereby restrains the locking mechanism 210 onto the speed hitch pin 200. The locking mechanism 210 may comprise washer components 213 and 215 for transmitting a biasing force to other components in the speed hitch pin 200. The biasing force may be produced by a spring 214 disposed between the washers 213 and 215. The biasing force is used to hold the locking mechanism 210 in the locked position unless a user depresses the actuator 211. The locking mechanism 210 may comprise a push rod 216 to transmit a user input from the actuator 211 to a friction structure 218. A user input needs to be greater than the biasing force provided by the spring 214. As the push rod 216 acts on the friction structure 218, friction is reduced between the friction structure 218 and a corresponding slot 219 on a sleeve member 220. A friction surface (not shown) on the slot 219 communicates with the friction structure to prevent the rotation of the sleeve member disposed around the alignment member 208. As the sleeve is rotated, the locking member 206 is moved from a locked position to an unlocked position and vice versa.

In use the locking mechanism 210 may be actuated by a user placing a thumb on the actuator 211 and depressing it. By gripping the sleeve member 220 such that a thumb is placed over the actuator 211 the speed hitch pin 200 may be used with a single hand. By depressing the actuator at the same time as rotating the sleeve member 220, the speed hitch pin 200 can be taken through a full range of motion single handedly.

Figure 14:
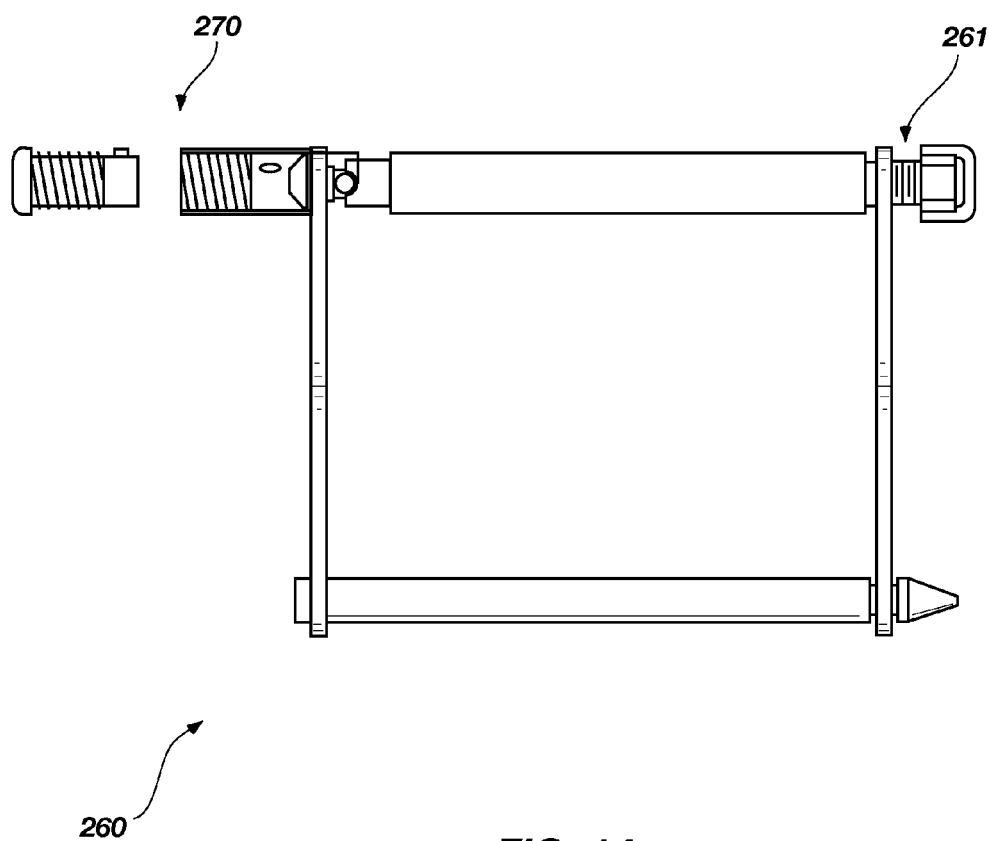
FIG. 14 is illustrative of one embodiment of the improved hitch pin with security features.
Figure 15:
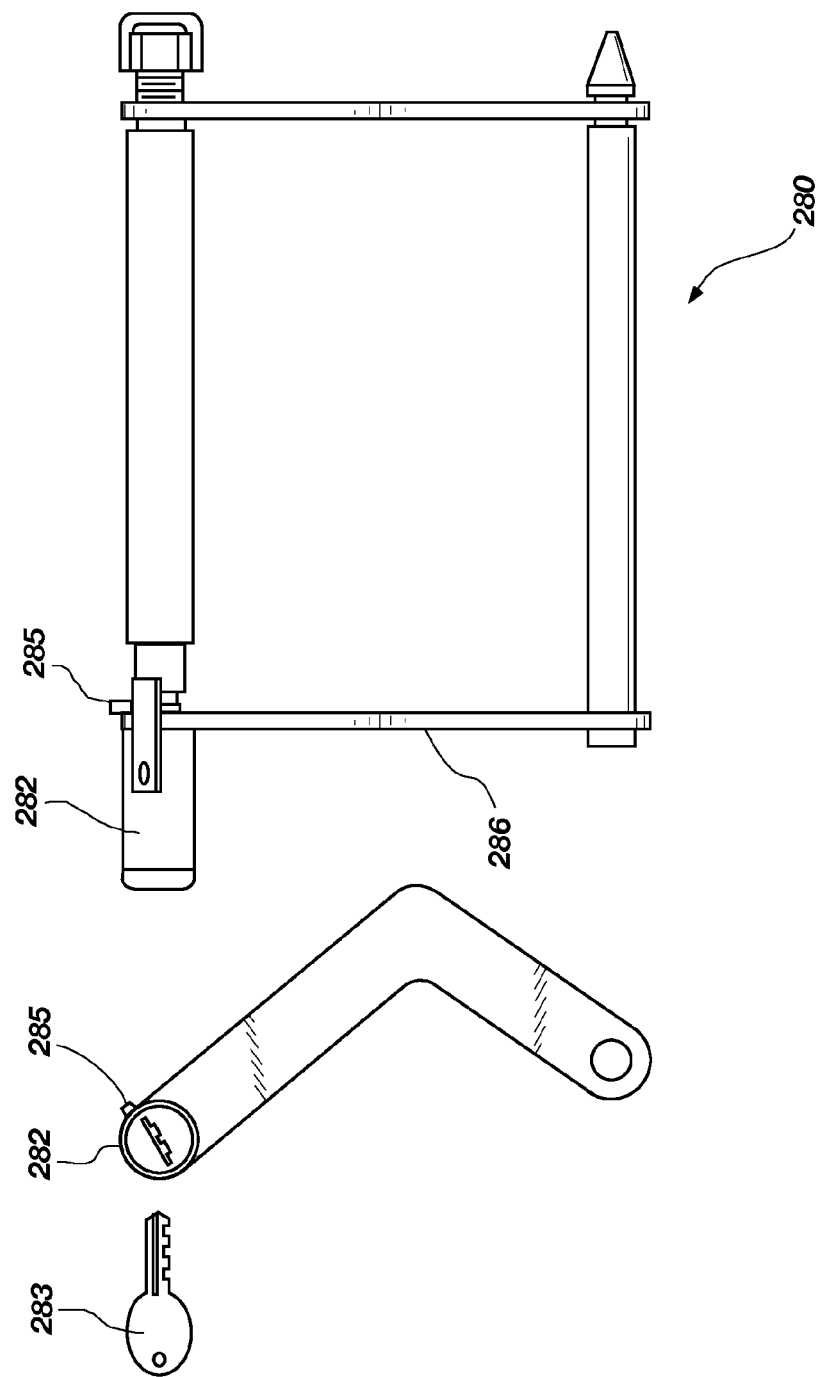
FIG. 15 is illustrative of one embodiment of the improved hitch pin with security features.

With reference to FIGS. 14 and 15 embodiments of security features will be discussed in regards to their incorporation on to speed hitch pins 260 and 280 respectively. In FIG. 14 a simple barrel lock 270 as known in the art, is disposed so as to restrict the motion of a push rod (not show) within a locking mechanism 261. As the locking mechanism is actuated, the internal push rod impacts the barrel lock and does not allow the unlocking of the locking mechanism 261 and thereby prevents the speed hitch pin 260 from being displaced. In FIG. 15 a key lock 282 is shown wherein a key 283 is inserted into a lock 282 and retracts or extends a protrusion 285. The protrusion 285 when extended may physically impede the rotation of the speed hitch pin's 280 locking member 286 and thereby does not allow the removal of the speed hitch pin 280. If the speed hitch pin cannot be removed from a receiver assembly, the accessory utilizing the receiver insert cannot be removed and stolen.

Figure 16:
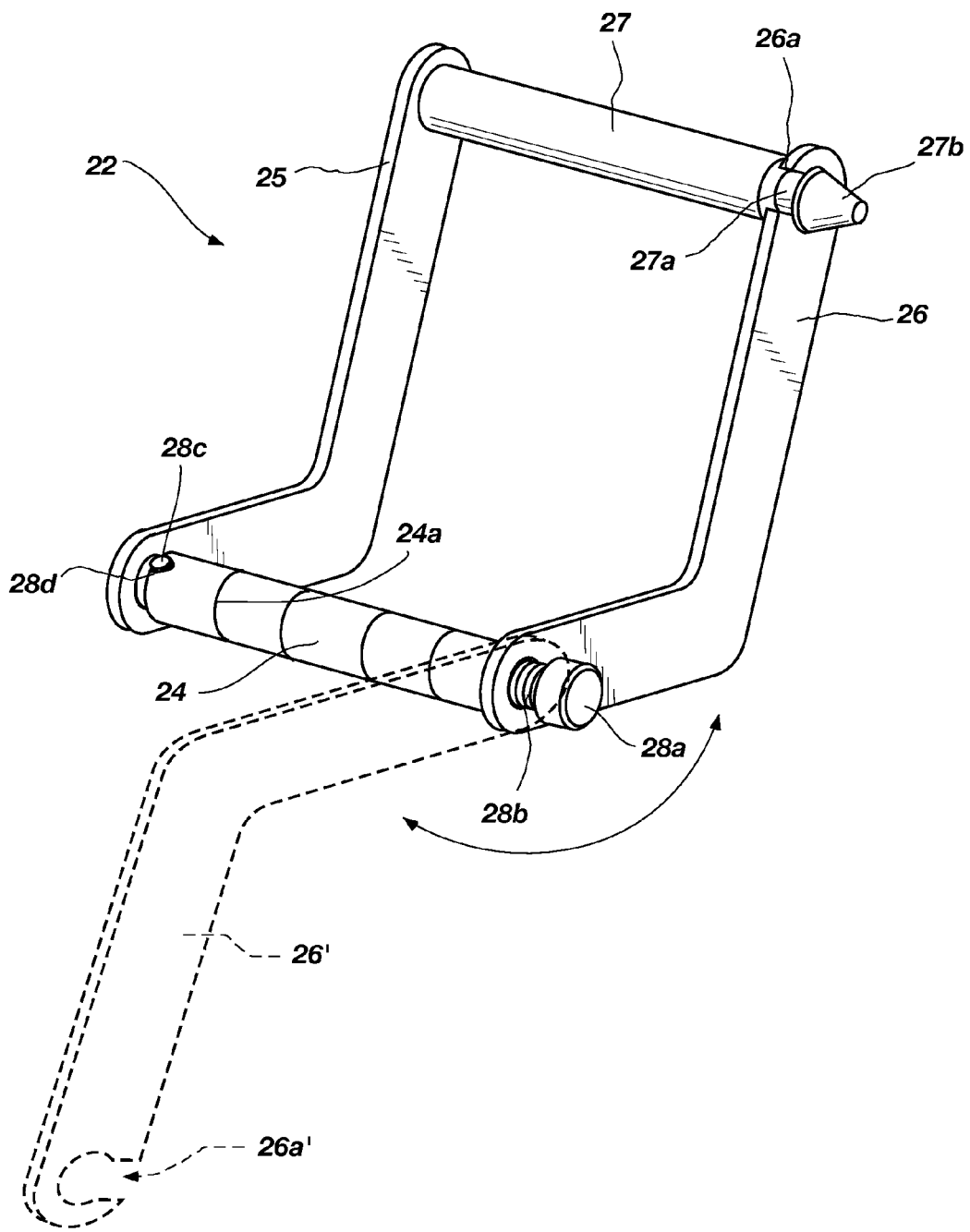
FIG. 16 is illustrative of one embodiment of the improved hitch pin in opened and closed configuration.

Referring now to FIG. 16 an embodiment of a method of use will now be discussed, in operation, a user grasps alignment member 24 and actuates an actuator 28a (which may be spring-tensioned by biasing device 28b if desired) which thereby releases friction structure 28c from a corresponding reactive structure which is designated in the FIG. 16 as surface 28d by the use of an arrow. This action may be accomplished by the actuator 28a being connected to a friction structure 28c by way of an internal push rod (not shown), such that when actuator 28a is pressed, the push rod pushes friction structure 28c out of communication with reactive structure 28d, thereby releasing locking mechanism 28a, 28b, 28c, 26. Locking member 26, friction structure 28c and the push rod, may be interconnected (or at least locking member 26 and friction structure 28c may be interconnected), such that when friction structure 28c is released from the reactive structure 28d, the locking member 26 may be rotated out of engagement with the free end 27a of the hitch pin 27, whereby locking member 26 and friction structure 28c are confined to rotational movement with each other with biasing device 28b remaining under compression. Locking member 26 may, for example, be rotated into a roughly 180-degree position when removed from its locked position, as shown in FIG. 16 respectively by the phantom-line depiction of a rotated locking member 26' having a hitch pin notch 26a'. When the locking member in phantom-line position 26' (or in some other position whether in a 180-degree position or in some other position) is moved toward the free end 27b of the hitch pin 27, the friction structure 28c rotates with the locking member 26, and the friction structure 26 snaps into place into reactive structure 28d by operation of the biasing device 28b. This occurs just as a recessed portion 27a of the free end 27b of hitch pin 27 is received into a hitch pin notch 26a of the locking member 26. The friction structure's 28c interaction with the reactive structure 28b blocks any further appreciable movement of locking member 26. The locking member 26 is thereby locked in place, because it cannot move relative to the hitch pin 27 until friction structure 28c is again released from reactive structure 28d by the pressing of the actuator 28a.

Figure 17:
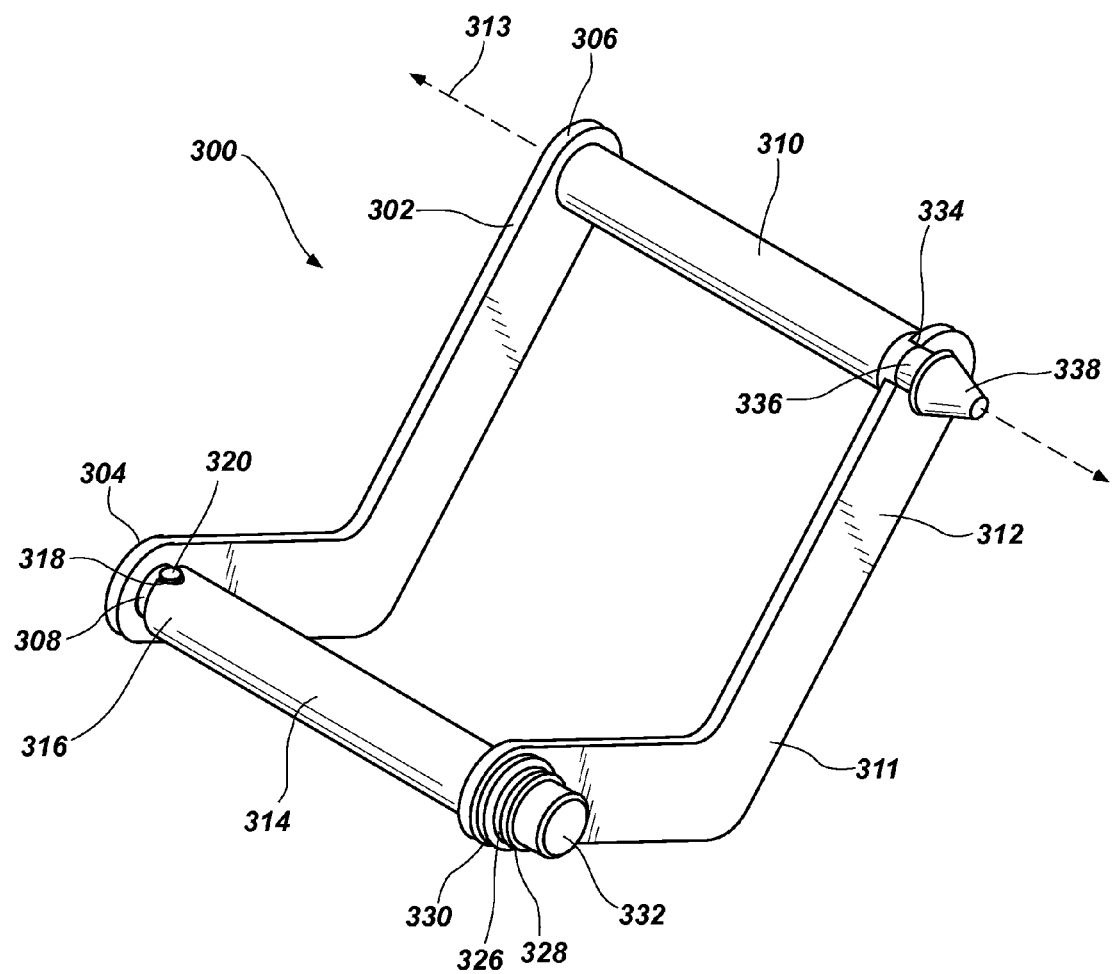
FIG. 17 is illustrative of one embodiment of the improved hitch pin disclosed herein.
Figure 18:
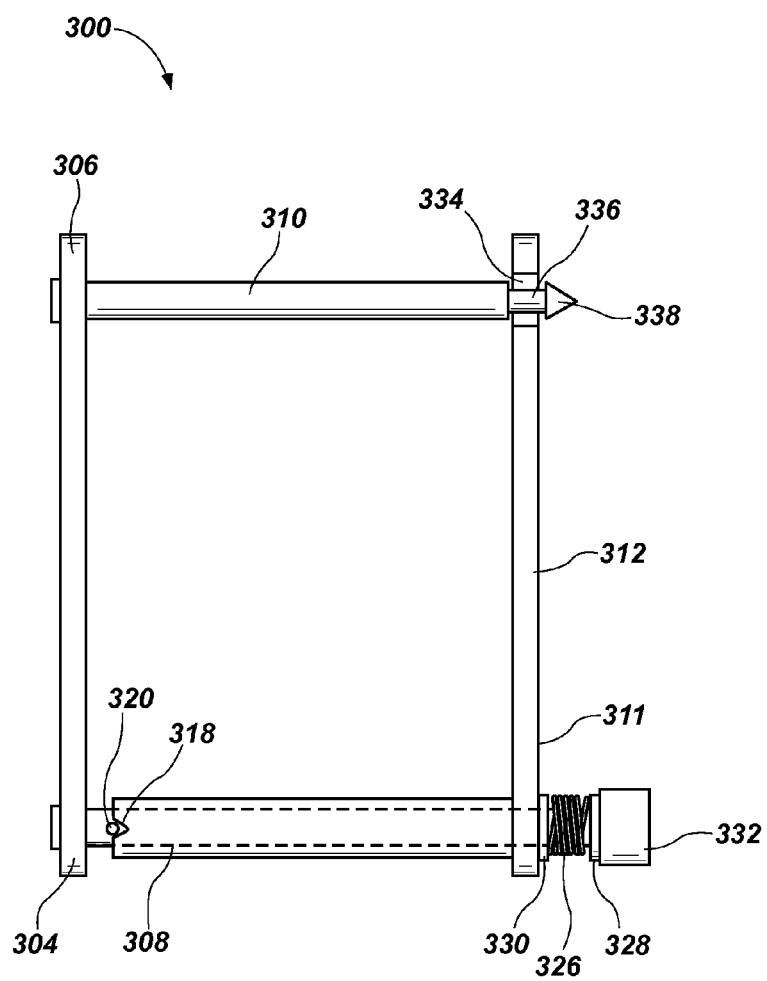
FIG. 18 is illustrative of one embodiment of the improved hitch pin disclosed herein.
Figure 19:
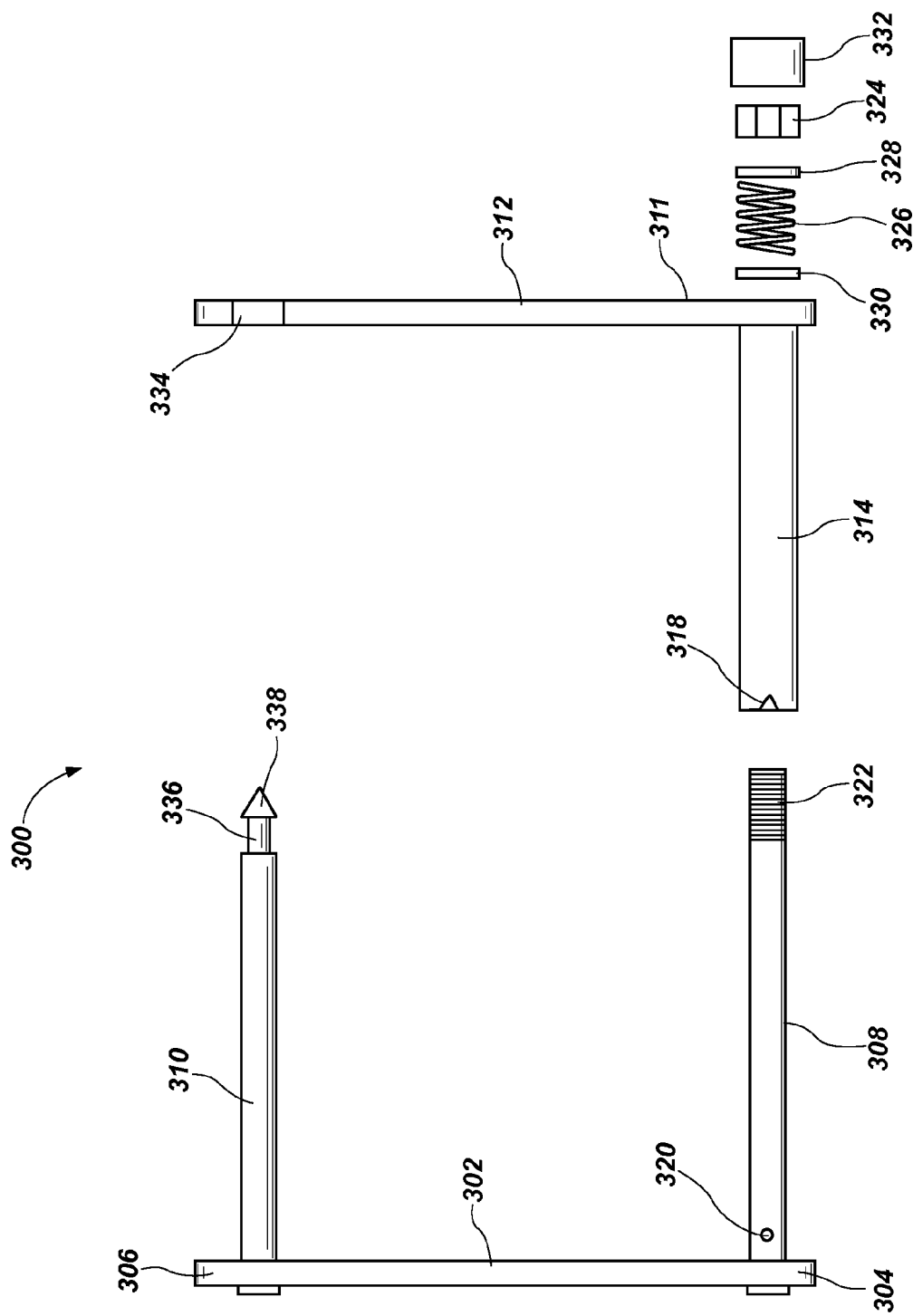
FIG. 19 is illustrative of one embodiment of the improved hitch pin disclosed herein.

Referring now to FIGS. 17, 18, and 19, there is depicted a hitch pin assembly 300 according to an embodiment of the present disclosure. The assembly 300 may comprise an extension member or fixed arm 302 having a first end 304 and a second end 306. A shaft or rigid member 308 may extend from the first end 304 of the extension member 302. A hitch pin 310 may extend from the second end 306 of the extension member 302 along a longitudinal axis 313 (FIG. 17). The hitch pin 310 may be configured and adapted for holding a receiver insert into a receiver as is known to one having ordinary skill in the art.

A locking member 311 may be pivotally mounted on the rigid member 308. In particular, the locking member 311 may comprise an outer member or sleeve member 314 extending from a locking arm 312. The sleeve member 314 may be mounted onto the rigid member 308. An axis extending through the sleeve member 314 and an axis extending through the rigid member 308 may be coaxial. The sleeve member 314 may rotate around the rigid member 308 such that the locking arm 312 rotates in a plane that is perpendicular to the longitudinal axis 313 of the hitch pin 310.

The sleeve member 314 may include a terminal end 316. A reactive structure 318 may be formed in the terminal end 316. The reactive structure 318 may take the form of a cutout. The reactive structure 318 may engage a friction structure 320. In an embodiment of the present disclosure, the friction structure 320 may be a pin. When the friction structure 320 in engaged by the reactive structure 318, the sleeve member 314 and the lock arm 312 may be prevented from rotating.

The rigid member 318 may include a threaded end 322 as perhaps best seen in FIG. 19. The threaded end 322 may receive a nut 324. The nut 324 may be utilized to secure the sleeve member 314 and the locking arm 312 on the rigid member 308. Interposed between the nut 324 and the locking arm 312, and mounted on the rigid member 308, may be a biasing member 326. Disposed at each end of the biasing member 326 may be washers 328 and 330. The biasing member 326 may comprise a spring. The biasing member 326 may maintain a force on the sleeve member 314 and the locking arm 312 such that the reactive structure 318 maintains engagement with the friction structure 320. The sleeve member 314 may be slidably positionable along a longitudinal axis of the shaft member 308 to thereby selectably engage and disengage a locking mechanism formed by the reactive structure 318 and the friction structure 320.

The locking arm 312 may also have a hitch pin notch 334 for corresponding with a recessed portion 336 formed on the hitch pin 310. A free end 338 of the hitch pin 310 may extend beyond the locking arm 312. A cap 332 may be place over the nut 324.

Figure 20:
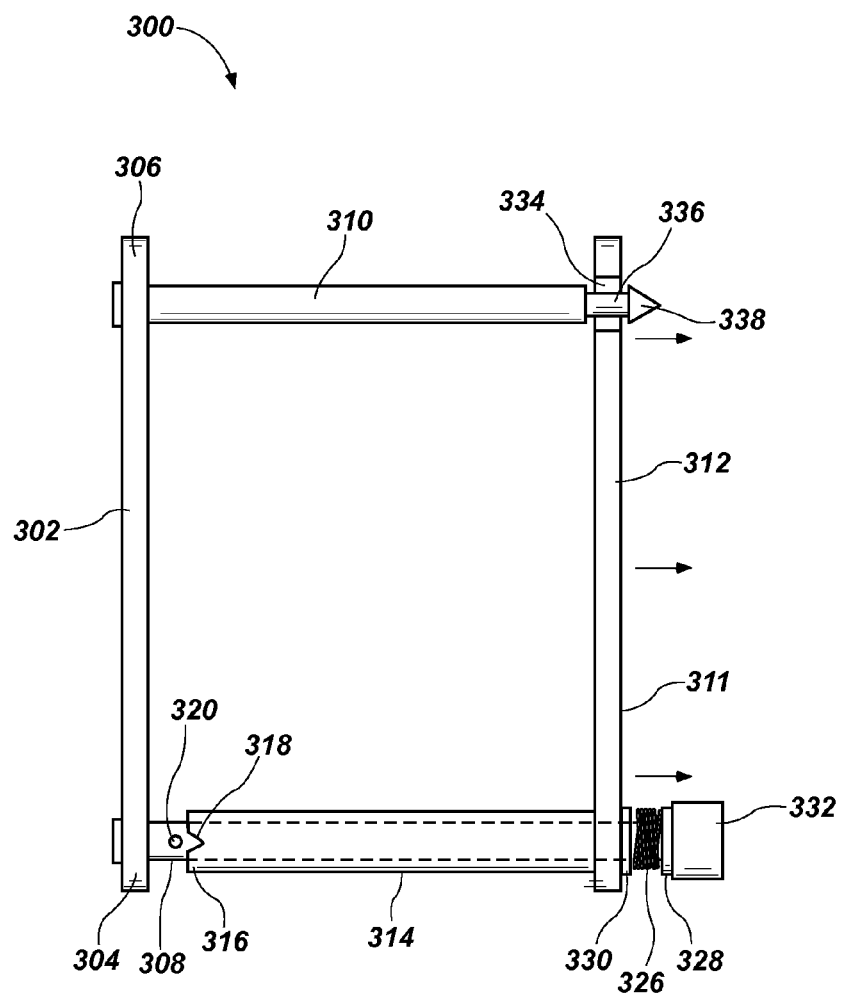
FIG. 20 is illustrative of one embodiment of the improved hitch pin disclosed herein.

Referring now to FIG. 20, there is shown the hitch pin assembly 300. To unlock and rotate the locking arm 312, a user may grasp the sleeve 314 with his hand. The user may then place his thumb on the cap 332. The user may then cause the locking arm 312 and the sleeve 314 to move in the direction as shown by the arrows in FIG. 20 by applying a pressure to the cap 332. In particular, the resilient member 326 is compressed during the action by the user. The reactive structure 318 may then disengage the friction member 320 such that the locking arm 312 and the sleeve 314 may freely rotate around the rigid member 308. With the locking arm 312 rotated, the hitch pin 310 may be inserted or removed from a hitch pin hole. The locking arm 312 may be locked back in place by rotating the sleeve 314 such that the reactive structure 318 and friction structure 320 re-engage with each other.

Figure 21:
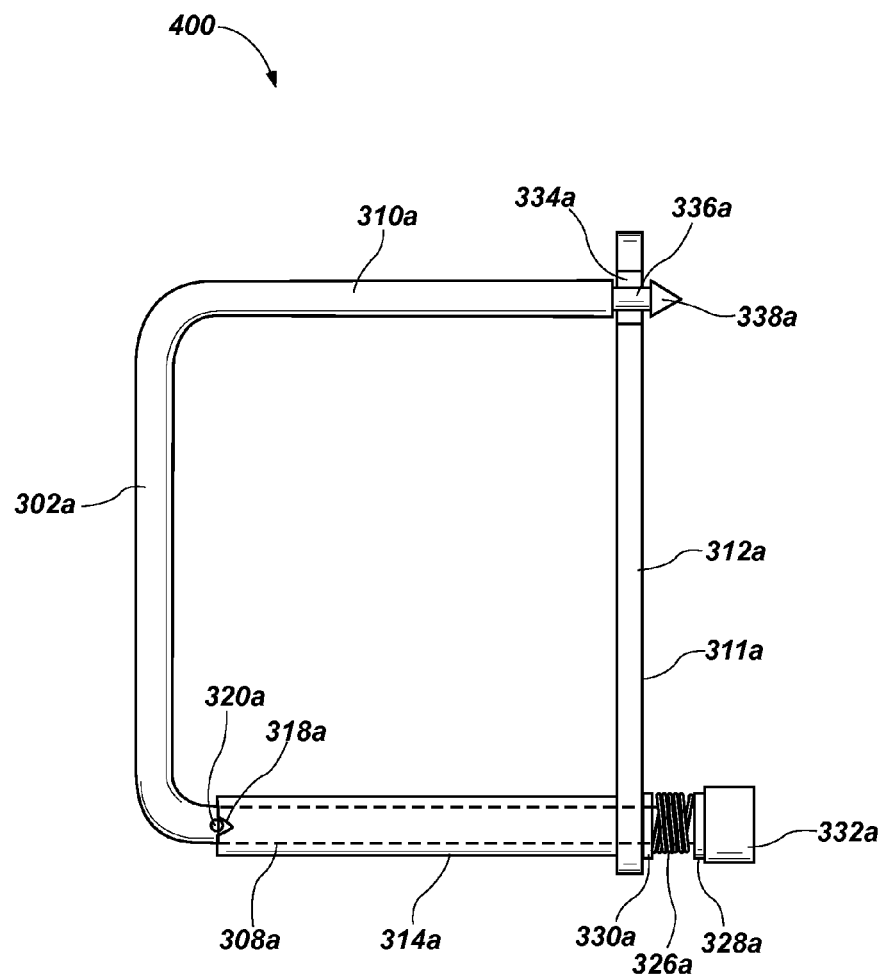
FIG. 21 is illustrative of one embodiment of the improved hitch pin disclosed herein.
Figure 22:
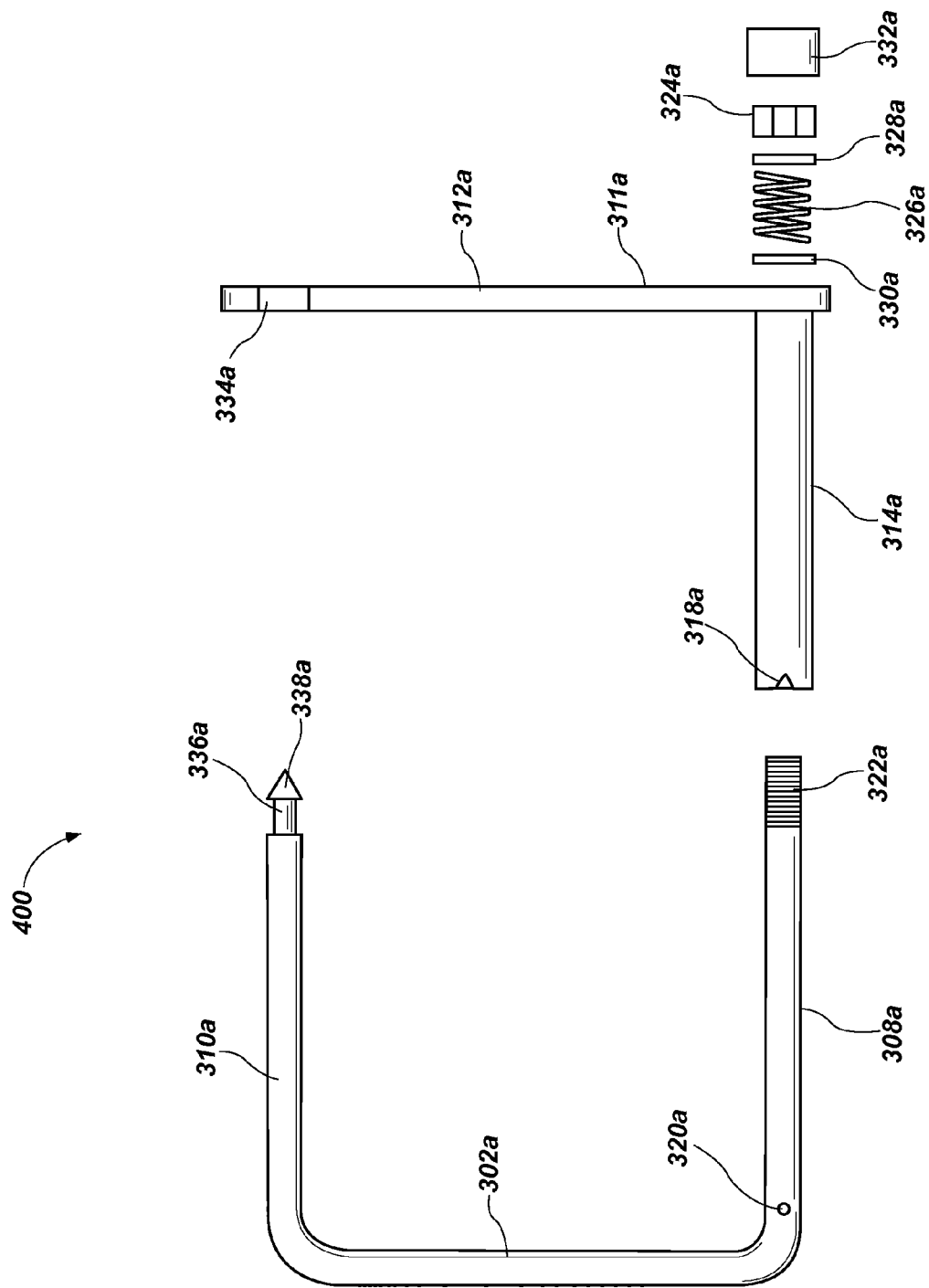
FIG. 22 is illustrative of one embodiment of the improved hitch pin disclosed herein.

Referring now to FIGS. 21 and 22, there is shown an embodiment of a hitch pin assembly 400 where reference numerals followed by the letter "a" depict like components as described above. The primary difference between the assemblies 300 and 400 is that in the assembly 400 the rigid member 308a, the extension member 302a, and the hitch pin 310a may be formed from a unitary and U-shaped rod.

A method of locking a receiver insert into a receiver may include the following steps:

placing a hitch pin into opposing holes formed in sides of the receiver and through a through hole of a receiver insert residing in the receiver with its through hole residing between, and in alignment with, the opposing holes in the sides of the receiver;

rotating a locking side of a speed hitch pin into engagement with a free end of a hitch pin of the speed hitch pin, to thereby cause a friction structure of the speed hitch pin to be received within a reactive structure.

Another method of locking a receiver insert into a receiver may include the following steps:

selecting a speed hitch pin having two opposing sides that are angled or bent;

grasping an alignment member of the speed hitch pin and guiding a first angled side into position near a first hole of two opposing holes formed in the receiver;

guiding a hitch pin connected to the first angled side into the first hole of two opposing holes formed in the receiver, and thereafter through a through hole of a receiver insert residing in the receiver with its through hole residing between and in alignment with the opposing holes of the receiver, and thereafter through the entire through hole of the receiver insert and then through a second of the two opposing holes formed in the receiver, such that a free end of the hitch pin protrudes from the receiver;

rotating a second angled side of the speed hitch pin into position against a free end of the hitch pin, to thereby secure the hitch pin within said two opposing holes formed in the receiver and with the through hole of the receiver insert, to thereby block movement of the receiver insert relative to the receiver.

The method above may further comprise the step of:

causing a friction structure to be received within a reactive structure when the second angled side is rotated into position against the free end of the hitch pin, said friction structure being connected to the second angled side of the two angled sides of the speed hitch pin, such that sides forming the reactive structure block movement of the friction structure when the friction structure is received into the reactive structure which in turn blocks movement of the second angled side relative to the free end of the hitch pin.

The method above may further include the step of resting the alignment member of the speed hitch pin upon the receiver insert or receiver, after the hitch pin resides within the through hole of the receiver insert, such that the angled sides extend below the alignment member when the speed hitch pin is in a locked position.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A hitch pin assembly for removably securing a receiver insert into a receiver of a tow vehicle, said receiver insert and said receiver having a hitch pin opening, the hitch pin assembly comprising:
   an elongate extension member having a first end and a second end;
   an elongate shaft member extending from the first end of the extension member;
   a hitch pin extending from the second end of the extension member; and
   an elongate locking member having a locking arm;
   wherein the locking member is mounted to said shaft member such that said locking member is rotatable between an open position and a locked position;
   wherein said locking arm prevents egress of the hitch pin from the hitch pin opening when the locking member is positioned to the locked position;
   wherein said locking arm rotates between the open position and the locked position in a plane that is perpendicular to a longitudinal axis of the hitch pin.

2. The hitch pin assembly of claim 1 wherein said hitch pin and said shaft member are parallel to each other.

3. The hitch pin assembly of claim 1 wherein said extension member, hitch pin and shaft member are of unitary construction.

4. The hitch pin assembly of claim 3 wherein said extension member, hitch pin and shaft member define a U-shape.

5. The hitch pin assembly of claim 1 further comprising a locking mechanism configured for constraining the rotation of said locking member.

6. The hitch pin assembly of claim 5 wherein said locking mechanism comprises an actuator for releasing the locking mechanism.

7. The hitch pin assembly of claim 6 wherein said locking mechanism comprises a detent mechanism that is actuated by said actuator.

8. The hitch pin assembly of claim 1 wherein the locking member further comprises a notch for receiving a portion of said hitch pin therein.

9. The hitch pin assembly of claim 8 wherein the hitch pin has a recessed portion thereon for receiving a portion of said locking member.

10. The hitch pin assembly of claim 9 wherein the notch in said locking member corresponds to the recessed portion in said hitch pin such that said notch and said recessed portions mechanically communicate to limit relative movement therebetween.

11. The hitch pin assembly of claim 1 wherein said extension member further comprises a bend.

12. The hitch pin assembly of claim 11 wherein said locking arm further comprises a bend.

13. A hitch pin assembly for removably securing a receiver insert into a receiver of a tow vehicle, said receiver insert and said receiver having a hitch pin opening, the hitch pin assembly comprising:
   an elongate extension member having a first end and a second
   an elongate shaft member extending from the first end of the extension member;
   a hitch pin extending from the second end of the extension member;
   a locking member comprising a locking arm and a sleeve member, the sleeve member extending in a fixed relationship from the locking arm and terminating at a terminal end;
   a locking mechanism that is operable to prevent rotation of the locking member;
   wherein said sleeve member of the locking member is mounted on said shaft member such that said locking arm is rotatable between an open position and a locked position;
   wherein said sleeve member is slidably positionable along a longitudinal axis of the shaft member to selectably engage and disengage the locking mechanism;
   wherein said locking arm prevents egress of the hitch pin from the hitch in opening when the locking arm is positioned to the locked position.

14. The hitch pin assembly of claim 13 further comprising a resilient member, wherein the resilient member biases said sleeve member in a direction along a longitudinal axis of the shaft member to maintain engagement of the locking mechanism.

15. The hitch pin assembly of claim 13 wherein the locking mechanism comprises a friction structure extending from said shaft member and a reactive structure formed in the terminal end of said sleeve member.

16. The hitch pin assembly of claim 13 further comprising a fastener for securing said sleeve member on said shaft member.

17. The hitch pin assembly of claim 16 wherein said resilient member is disposed on the shaft member between the sleeve member and the fastener.

18. The hitch pin assembly of claim 13 wherein said reactive structure is a cutout formed in a terminal end of the sleeve member.

19. The hitch pin assembly of claim 13 where said friction structure is a pin extending from said shaft member.

20. The hitch pin assembly of claim 13 wherein a longitudinal axis of the sleeve member and a longitudinal axis of the hitch pin are parallel.

21. The hitch pin assembly of claim 13 wherein the sleeve member and the shaft member are coaxial.

22. The hitch pin assembly of claim 13 wherein said locking mechanism comprises an actuator disposed on the end of the shaft member.

23. The hitch pin assembly of claim 13 wherein the sleeve member extends perpendicularly from the locking arm.

24. The hitch pin assembly of claim 13 wherein the extension member, shaft member and the hitch pin comprise a unitary construction.

25. The hitch pin assembly of claim 13 wherein the locking arm further comprises a notch for receiving a portion of said hitch pin therein.

26. The hitch pin assembly of claim 25 wherein the hitch pin has a recessed portion thereon for receiving a portion of said locking member.

27. The hitch pin assembly of claim 26 wherein the notch in said locking arm corresponds to the recessed portion in said hitch pin such that said notch and said recessed portions mechanically communicate to limit relative movement therebetween.

28. The hitch pin assembly of claim 13 wherein each of said extension member and locking arm further comprises a bend.

29. A hitch system for a vehicle comprising:
   a receiver insert;
   a receiver configured for attachment to a vehicle;
   a hitch pin opening extending through the receiver insert and the receiver;
   wherein said insert comprises an elongate portion for being received by said receiver; and a hitch pin assembly for removably securing said receiver insert into said receiver comprising:
  an elongate extension member having a first end and a second end;
  an elongate shaft member extending from the first end of the extension member;
  a hitch pin extending from the second end of the extension member and having a longitudinal axis; and
  an elongate locking member having a locking arm;
  wherein the locking member is mounted to said shaft member such that said locking member is rotatable between an open position and a locked position;
  wherein said locking arm prevents egress of the hitch pin from the hitch ping opening when the locking member is positioned to the locked position;
  wherein said locking arm rotates between the open position and the locked position in a plane that is perpendicular to the longitudinal axis of the hitch pin.

30. The hitch system of claim 29 wherein said hitch pin and said shaft member are parallel to each other.

31. The hitch system of claim 29 wherein said extension member, hitch pin and shaft member are of unitary construction.

32. The hitch system of claim 29 wherein said extension member, hitch pin and shaft member define a U-shape.

33. The hitch system of claim 29 further comprising a locking mechanism configured for constraining the rotation of said locking member.

34. The hitch system of claim 33 wherein said locking mechanism comprises an actuator for releasing the locking mechanism.

35. The hitch system of claim 34 wherein said locking mechanism comprises a detent mechanism that is actuated by said actuator.

36. The hitch system of claim 29 wherein said extension member further comprises a bend.

37. The hitch system of claim 29 wherein said locking member further comprises a bend.

38. The hitch system of claim 29 wherein said locking member is slidably positionable along a longitudinal axis of the shaft member to selectably engage and disengage a locking mechanism operable to restrain rotation of the locking member.

39. A method of securing a receiver insert into a receiver attached to a tow vehicle, said receiver insert and said receiver having a hitch pin opening for receiving a hitch pin, said method comprising:
  installing the receiver insert into the receiver of the tow vehicle;
  securing the receiver insert into the receiver using a hitch pin assembly, wherein the hitch pin assembly comprises:
    an elongate extension member having a first end and a second end;
    an elongate shaft member extending from the first end of the extension member;
    a hitch pin extending from the second end of the extension member; and
    an elongate locking member having a locking arm;
    wherein the locking member is mounted to said shaft member such that said locking member is rotatable between an open position and a locked position;
    wherein said locking arm prevents egress of the hitch pin from the hitch pin opening when the locking member is positioned to the locked position;
    wherein said locking arm rotates between the open position and the locked position in a plane that is perpendicular to a longitudinal axis of the hitch pin.

40. The method of claim 39 wherein said hitch pin and said shaft member are parallel to each other.

41. The method of claim 39 wherein said extension member, hitch pin and shaft member are of unitary construction.

42. The method of claim 41 wherein said extension member, hitch pin and shaft member form a U-shape.

43. The method of claim 39 further comprising a locking mechanism configured for constraining the rotation of said locking member.

44. The method of claim 43 wherein said locking mechanism comprises an actuator for releasing the locking mechanism.

45. The method of claim 44 wherein said locking mechanism comprises a detent mechanism that is actuated by said actuator.

46. The method of claim 39 wherein said extension member further comprises a bend.

47. The method of claim 39 wherein said locking member further comprises a bend.

48. A method of securing a receiver insert into a receiver attached to a tow vehicle, said receiver insert and said receiver having a hitch pin opening for receiving a hitch pin, said method comprising:
  installing the receiver insert into the receiver of the tow vehicle;
  securing the receiver insert into the receiver using a hitch pin assembly, wherein the hitch pin assembly comprises:
    elongate extension member having a first end and a second end;
    an elongate shaft member extending from the first end of the extension member;
    a hitch pin extending from the second end of the extension member;
    a locking member having a locking arm and a sleeve member, the sleeve member extending in a fixed relationship from the locking arm and terminating at a terminal end;
    a locking mechanism that is operable to prevent rotation of the locking member;
    wherein said sleeve member of the locking member is mounted on said shaft member such that said locking arm is rotatable between an open position and a locked position;
    wherein said sleeve member is slidably positionable along a longitudinal axis of the shaft member to selectably engage and disengage the locking mechanism;
    wherein said locking arm prevents egress of the hitch pin from the hitch pin opening when the locking arm is positioned to the locked position.

49. The hitch pin assembly of claim 48 further comprising a resilient member, wherein the resilient member biases said sleeve member in a direction along a longitudinal axis of the shaft member to maintain engagement of the locking mechanism.

50. The hitch pin assembly of claim 48 wherein the locking mechanism comprises a friction structure extending from said shaft member and a reactive structure formed in the terminal end of said sleeve member.

51. The hitch pin assembly of claim 48 further comprising a fastener for securing said sleeve member on said shaft member.

52. The hitch pin assembly of claim 51 wherein said resilient member is disposed on the shaft member between the sleeve member and the fastener.

53. The hitch pin assembly of claim 48 wherein a longitudinal axis of the sleeve member and a longitudinal axis of the hitch pin are parallel.

54. The hitch pin assembly of claim 48 wherein the sleeve member and the shaft member are coaxial.

55. The hitch pin assembly of claim 48 wherein said locking mechanism comprises an actuator disposed on the end of the shaft member.

56. The hitch pin assembly of claim 48 wherein the sleeve member extends perpendicularly from the locking arm.

57. The hitch pin assembly of claim 48 wherein each of said extension member and locking arm further comprises a bend.

58. A hitch pin assembly for removably securing a receiver insert into a receiver of a tow vehicle, said receiver insert and said receiver having a hitch pin opening, the hitch pin assembly comprising:
- an elongate extension member having a first end and a second end;
- an elongate shaft member extending from the first end of the extension member;
- a hitch pin extending from the second end of the extension member;
- a locking member having a locking arm and a sleeve member, the sleeve member extending in a fixed relationship from the locking arm and terminating at a terminal end;
- a locking mechanism that is operable to prevent rotation of the locking member;
- a resilient member;
- a fastener for securing said sleeve member on said shaft member;
- wherein said sleeve member of the locking member is mounted on said shaft member such that said locking arm is rotatable between an open position and a locked position;
- wherein said sleeve member is slidably positionable along a longitudinal axis of the shaft member to selectably engage and disengage the locking mechanism;
- wherein said locking arm prevents egress of the hitch pin from the hitch pin opening when the locking arm is positioned to the locked position;
- wherein said locking arm rotates between the open position and the locked position in a plane that is perpendicular to a longitudinal axis of the hitch pin;
- wherein the resilient member biases said sleeve member in a direction along a longitudinal axis of the shaft member to maintain engagement of the locking mechanism;
- wherein the locking mechanism comprises a friction structure extending from said shaft member and a reactive structure formed in the terminal end of said sleeve member;
- wherein said resilient member is disposed on the shaft member between the sleeve member and the fastener;
- wherein said reactive structure is a cutout formed in a terminal end of the sleeve member;
- wherein said friction structure is a pin extending from said shaft member.

* * * * *